US010984622B2

(12) United States Patent
Troesch et al.

(10) Patent No.: US 10,984,622 B2
(45) Date of Patent: Apr. 20, 2021

(54) ACCESS CONTROL SYSTEM WITH FEEDBACK TO PORTABLE ELECTRONIC DEVICE

(71) Applicant: Inventio AG, Hergiswil (CH)

(72) Inventors: Florian Troesch, Zurich (CH); John Mizon, Cham (CH); Serhiy Serbin, Cham (CH)

(73) Assignee: Inventio AG

( * ) Notice: Subject to any disclaimer, the term of this patent is extended or adjusted under 35 U.S.C. 154(b) by 404 days.

(21) Appl. No.: 15/532,218

(22) PCT Filed: Dec. 2, 2015

(86) PCT No.: PCT/EP2015/078274
§ 371 (c)(1),
(2) Date: Jun. 1, 2017

(87) PCT Pub. No.: WO2016/087482
PCT Pub. Date: Jun. 9, 2016

(65) Prior Publication Data
US 2017/0270725 A1 Sep. 21, 2017

(30) Foreign Application Priority Data
Dec. 2, 2014 (EP) .................................... 14195827

(51) Int. Cl.
*G07C 9/29* (2020.01)
*B66B 1/46* (2006.01)
(Continued)

(52) U.S. Cl.
CPC ................ *G07C 9/29* (2020.01); *B66B 1/468* (2013.01); *G07C 9/00* (2013.01); *G07C 9/00174* (2013.01); *G07C 9/00309* (2013.01); *G07C 9/00896* (2013.01); *G07C 9/27* (2020.01); *B66B 2201/4653* (2013.01); *G07C 9/32* (2020.01); *G07C 2009/00388* (2013.01); *G07C 2009/00769* (2013.01); *G07C 2209/62* (2013.01)

(58) Field of Classification Search
CPC ... B66B 1/468; B66B 2201/4653; G07C 9/29; G07C 9/27; G07C 9/00; G07C 9/00174; G07C 9/00309; G07C 9/00896; G07C 9/32
USPC .......................................................... 187/380
See application file for complete search history.

(56) References Cited

U.S. PATENT DOCUMENTS 7,093,693 B1 * 8/2006 Gazdzinski ............. B66B 1/468 187/384
7,664,464 B2 * 2/2010 Gerstenkorn ...... G07C 9/00309 187/380
(Continued)

FOREIGN PATENT DOCUMENTS

| | | | |
|---|---|---|---|
| CN | 101872494 | A | 10/2010 |
| WO | 2008145803 | A1 | 12/2008 |
| WO | 2013/191705 | A1 | 12/2013 |

*Primary Examiner* — David S Warren
(74) *Attorney, Agent, or Firm* — Bressler, Amery and Ross; Pierre R. Yanney

(57) ABSTRACT

Methods and systems to control access to a predetermined service or area. An access code is read from a portable electronic device of a user using an access terminal at a service site. As a result of reading the access code from the portable electronic device, access-related information is transmitted to the portable electronic device.

17 Claims, 17 Drawing Sheets

(51) Int. Cl.

| | |
|---|---|
| ***G07C 9/00*** | (2020.01) |
| ***G07C 9/27*** | (2020.01) |
| *G07C 9/32* | (2020.01) |

(56) References Cited

U.S. PATENT DOCUMENTS

| | | | | |
|---|---|---|---|---|
| 7,729,691 | B2 * | 6/2010 | Newville | G06Q 30/0207 187/247 |
| 8,401,472 | B2 * | 3/2013 | Gerstenkorn | B66B 1/468 187/380 |
| 8,446,249 | B2 * | 5/2013 | Gerstenkorn | G08C 19/00 340/5.2 |
| 8,730,004 | B2 * | 5/2014 | Elfstrom | G06Q 10/02 340/5.6 |
| 9,064,403 | B2 * | 6/2015 | Gerstenkorn | G08C 19/00 |
| 9,477,317 | B1 * | 10/2016 | Clements | G06F 3/017 |
| 9,850,093 | B2 * | 12/2017 | DePaola | G07C 9/20 |
| 9,945,675 | B2 * | 4/2018 | Schuster | B66B 1/468 |
| 10,026,246 | B2 * | 7/2018 | Friedli | B66B 1/468 |
| 10,043,325 | B2 * | 8/2018 | Friedli | B66B 1/468 |
| 10,173,862 | B2 * | 1/2019 | Colombano | B66B 5/00 |
| 10,370,220 | B2 * | 8/2019 | Simcik | B66B 1/3407 |
| 2003/0043018 | A1 * | 3/2003 | Gerstenkorn | G07C 9/00103 340/5.61 |
| 2003/0081746 | A1 * | 5/2003 | Ahlstrom | H04M 11/025 379/102.06 |
| 2003/0081747 | A1 * | 5/2003 | Ahlstrom | H04M 11/025 379/102.06 |
| 2003/0132830 | A1 * | 7/2003 | Dow | G07C 9/00103 340/5.22 |
| 2007/0025315 | A1 * | 2/2007 | Gerstenkorn | G07C 9/00309 370/342 |
| 2007/0026802 | A1 * | 2/2007 | Gerstenkorn | B66B 1/468 455/41.2 |
| 2007/0045051 | A1 * | 3/2007 | Gerstenkorn | B66B 1/468 187/380 |
| 2011/0035604 | A1 | 2/2011 | Habraken | |
| 2011/0187493 | A1 * | 8/2011 | Elfstrom | G06Q 10/02 340/5.6 |
| 2011/0247901 | A1 * | 10/2011 | Wilke | H04W 12/0609 187/247 |
| 2011/0291798 | A1 | 12/2011 | Schibuk | |
| 2012/0037461 | A1 | 2/2012 | Finschi | |
| 2012/0068818 | A1 | 3/2012 | Mizon | |
| 2012/0075057 | A1 | 3/2012 | Fyke et al. | |
| 2012/0305340 | A1 * | 12/2012 | Wu | B66B 1/34 187/381 |
| 2012/0318617 | A1 | 12/2012 | Sarjanen et al. | |
| 2013/0116835 | A1 * | 5/2013 | Nowel | F24F 11/30 700/278 |
| 2013/0249668 | A1 * | 9/2013 | Gerstenkorn | G07C 9/00309 340/5.2 |
| 2016/0035161 | A1 * | 2/2016 | Friedli | B66B 1/468 340/5.28 |
| 2016/0207735 | A1 * | 7/2016 | Elomaa | B66B 1/2458 |
| 2016/0297640 | A1 * | 10/2016 | Witczak | B66B 1/2466 |
| 2016/0347577 | A1 * | 12/2016 | Simcik | B66B 1/3407 |
| 2017/0174473 | A1 * | 6/2017 | Simcik | B66B 1/468 |
| 2017/0217727 | A1 * | 8/2017 | Scoville | B66B 1/468 |
| 2017/0270725 | A1 * | 9/2017 | Troesch | B66B 1/468 |
| 2017/0297864 | A1 * | 10/2017 | Koivisto | B66B 1/463 |
| 2018/0118510 | A1 * | 5/2018 | Simcik | B66B 1/468 |
| 2018/0118511 | A1 * | 5/2018 | Baldi | B66B 1/468 |
| 2018/0118512 | A1 * | 5/2018 | Baldi | B66B 1/468 |
| 2018/0121072 | A1 * | 5/2018 | Baldi | H04W 4/029 |
| 2018/0162688 | A1 * | 6/2018 | Troesch | B66B 1/468 |
| 2018/0270667 | A1 * | 9/2018 | Gideon, III | H04L 63/102 |
| 2018/0278462 | A1 * | 9/2018 | Bjontegard | H04L 41/044 |
| 2018/0282113 | A1 * | 10/2018 | Simcik | B66B 1/468 |
| 2018/0282114 | A1 * | 10/2018 | Baldi | B66B 1/3461 |
| 2018/0288213 | A1 * | 10/2018 | Bjontegard | H04L 41/044 |
| 2018/0316652 | A1 * | 11/2018 | Shila | H04L 63/0485 |
| 2019/0047817 | A1 * | 2/2019 | Salmikuukka | B66B 1/468 |
| 2019/0084794 | A1 * | 3/2019 | Scoville | B66B 1/3453 |
| 2019/0100405 | A1 * | 4/2019 | Scoville | B66B 1/3415 |
| 2019/0135580 | A1 * | 5/2019 | Scoville | B66B 1/468 |

* cited by examiner

ACCESS CONTROL SYSTEM WITH FEEDBACK TO PORTABLE ELECTRONIC DEVICE

CROSS-REFERENCE TO RELATED APPLICATIONS

This application is the national phase application under 35 U.S.C. § 371 claiming the benefit of priority based on International Patent Application No. PCT/EP2015/078274, filed on Dec. 2, 2015, which claims the benefit of priority based on European Patent Application No. 14195827.2, filed on Dec. 2, 2014. The contents of each of these applications are herein incorporated by reference.

FIELD OF INVENTION

This disclosure relates generally to systems that require user action before providing service to the user, such as granting access to a restricted area, transporting the user to a destination floor or guiding the user. Examples of such systems include access control systems, guidance systems and elevator systems.

BACKGROUND OF THE INVENTION

Access control systems typically require a user to present to the system something that is intended to serve as evidence that the user is authorized to receive access from the system. For example some systems grant access to a user based on a token (e.g., an identification card or a key fob) in the user's possession. The token can be an RFID (radio-frequency identification) tag or other information-storage device. In other systems, access is granted to a user based on information that the user provides to the system, such as a password. Some systems require multiple items from a user, fir example, both a token and a password.

US20110291798A1 describes a system in which an electronic device, such as a smartphone, stores a digitally signed physical access rights file. An individual uses this rights file to gain access to a restricted area only after self-authenticating to the device. A physical access control system receives the rights file, validates it, and determines whether to permit passage through a physical barrier. An access control gateway may transmit an authorization code to the electronic device and the physical barrier system, whereby passage is only permitted if the barrier system subsequently receives the authorization code from the electronic device using near field communications.

Certain elevator systems, in particular those installed in commercial buildings and having several elevator cars that operate in parallel to service individual elevator calls, e.g., in hotels or office buildings, require a user to present to the system something that is intended to serve as evidence that the user is authorized to use the elevator system. For example, in an elevator system having a destination control system, the user presents an RFID card to a floor terminal to automatically call an elevator. An identification code read from the RFID card is used to determine if the user is authorized to use the elevator system and what destination floor is stored for that user.

Such access control systems and elevator systems are already automated to a certain degree to facilitate usability. Further improvements as to usability could be advantageous, in particular without sacrificing on security. This is addressed by at least some of the embodiments covered by the claims.

SUMMARY OF THE INVENTION

A system that controls access to certain services or areas, or another access code issuing entity can be configured to send an access code or information related to such an access code to a portable electronic device of a user. At an access-restricted area, the user presents the portable electronic device to an access terminal, which reads the access code from the device. If the access code read from the device matches the access code that was sent to the device by the system, then the access control system sends access-related information to the portable electronic device. In that way, the user not only may be granted access, but receive additional receive that may improve orientation.

More specifically, one aspect of the improved technology described herein involves a method that includes reading an access code from a portable electronic device of a user using an electronic reader at a service site. As a result of reading the access code from the portable electronic device, service-related information is provided to the portable electronic device.

Another aspect involves a system having a sensor, an access terminal, a wireless communication network, a database and a computer-based control unit coupled to the sensor, the access terminal, the wireless communication network, and the database. The control unit includes a processor and a computer-readable storage medium that includes instructions that cause the processor to read an access code from the portable electronic device of a user using the sensor. Further, the instructions cause the processor to provide, as a result of reading the access code from the portable electronic device, service-related information to the portable electronic device.

Depending on a particular embodiment, the user may be granted access to the access-restricted area, either before, after or concurrently with providing the service-related information to the portable electronic device.

Briefly, the technology described herein provides convenient and user-friendly access to a service or area by means of a portable electronic device carried by a user. The portable electronic device is not only used to receive the access code required to obtain access to the service or area, but also to communicate service-related information to the user. In one embodiment, the access control system is coupled to an elevator control system that controls operation of at least one elevator, more particularly the operation of individual elevators in a group of elevators. The (elevator) user may use the portable electronic device in combination with the access code to call and obtain access to an elevator. The elevator control system processes the call associated with the read access code and assigns an elevator to service that call. In such an application, the service-related information may be an indication of an assigned elevator to service that call, or guidance information or a combination of the assigned elevator and guidance information. The assigned elevator is communicated to the user, e. g., using a display of the portable electronic device. The service-related information provided to the user facilitates, for example, orientation once the user is granted access.

In one embodiment, the access-related information is communicated to the user by displaying at least one of text and one or more pictograms or symbols, a web page and/or by generating an audible announcement. These alternatives provide flexibility in adapting to particular situations, including communicating with handicapped users.

Flexibility is also achieved in embodiments that use a webpage, in particular one that adapts its content to a particular status of a process. Such a webpage may be referred to as dynamic. In certain embodiments, the service-related information is provided to the portable electronic device using such a webpage that is displayed on the portable electronic device. The webpage may further be used to display the access code on the portable electronic device, and to request the access code. Also, an audio message may be generated in conjunction with the service-related information at the portable electronic device, for example in connection with using the webpage.

In one embodiment, the access code is represented as an optical code. Several examples of optical codes, including color codes, are described herein. The optical code can be displayed on a display of the portable electronic device, and the user can conveniently place the portable electronic device close to the system's sensor so that the optical code can be sensed. In that way, the user does not have to manually enter the code.

In certain embodiments, communications with the portable electronic device are based on a device identifier of the portable electronic device. For example, the access code is sent to the portable electronic device based on the device identifier (e.g., which may be a telephone number). This allows a user to receive the access code independent of the user's location. The device identifier may include a global identifier for a communications system that is external to an access control system. Depending on a particular embodiment, the device identifier includes a telephone number associated with the portable electronic device, an address for a push-notification service, a Bluetooth device address, or an e-mail address for an e-mail account that can be accessed through the portable electronic device. These alternatives provide flexibility regarding adapting the technology for different applications.

In some cases, the portable electronic device is in an unlocked state when the access code is read from the portable electronic device at the access terminal. This requires the user to first unlock the portable electronic device before the access code can be used. As only a legitimate user should be able to unlock the device (e.g., by entering a PIN), additional security is provided against illegitimate use of the access code.

At least some embodiments of the disclosed methods can be implemented using a computer or computer-based device that performs one or more method acts, the computer or computer-based device having read instructions for performing the method acts from one or more computer-readable storage media. The computer-readable storage media can comprise, for example one or more of optical disks, volatile memory components (such as DRAM or SRAM), or non-volatile memory components (such as hard drives, Flash RAM or ROM). The computer-readable storage media do not cover pure transitory signals. The methods disclosed herein are not performed solely in the human mind.

BRIEF DESCRIPTION OF THE DRAWINGS

The novel features and method steps characteristic of the improved technology described herein are set out in the claims below. The improved technology itself, however, as well as other features and advantages thereof are best understood by reference to the detailed description, which follows, when read in conjunction with the accompanying drawings, wherein:

DETAILED DESCRIPTION OF EMBODIMENTS OF THE INVENTION

Figure 1:
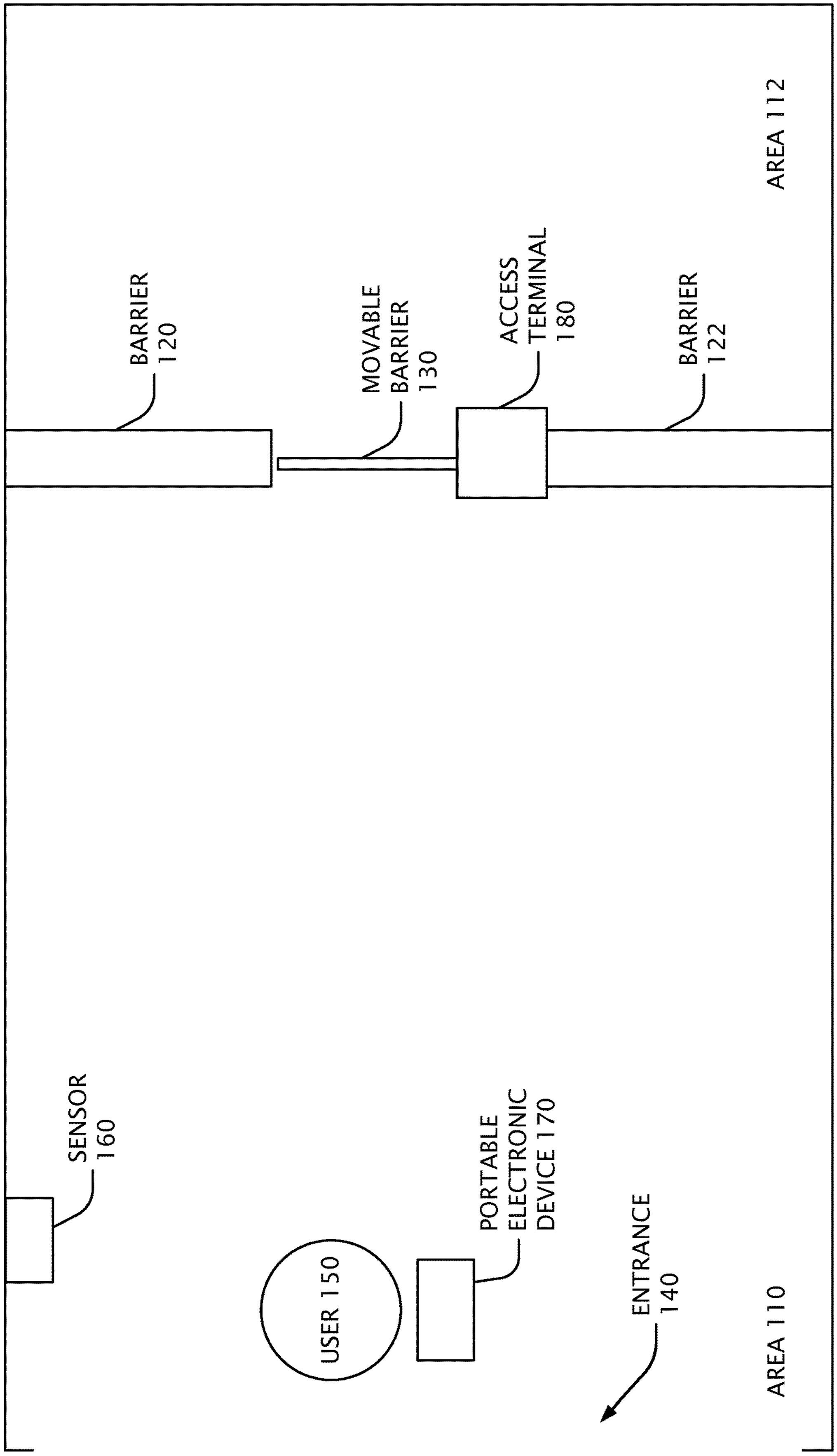
FIG. 1 shows a plan view of an exemplary embodiment of an area using an access control system.

FIG. 1 shows a plan view of an exemplary embodiment of an area using an access control system. As used herein, an access control system is not limited to merely controlling access to an access-restricted or secure area; the access control system may also be used to grant access to certain services or in conjunction with calling an elevator. In some embodiments, the functionalities of controlling access and calling an elevator may be integrated into a system. One or more of the disclosed technologies can be used in a setting like that of FIG. 1; however, at least some embodiments can also be used in other settings.

FIG. 1 shows an area 110 and an area 112. In this case, access to the area 110 is, at least some of the time, generally not regulated by an access control system. One possible example of the area 110 is a building lobby that is generally accessible to the public from an exterior building door. Access to the area 112, on the other hand, is generally regulated by an access control system. The area 112 is thus considered a "secure" area. One possible example is an office area that is intended to be accessible only by employees and their guests. The office area may have several floors served by one or more elevators. In the particular case shown in FIG. 1, the area 112 is divided from the area 110 by a set of physical barriers 120, 122 and by a movable barrier 130. In other embodiments, physical and movable barriers are not present—instead, one or more boundaries between the areas 110, 112 are electronically monitored. If a boundary or barrier is crossed by an unauthorized party, the access control system does not open a door or barrier, or the system initiates a countermeasure (e.g., security personnel are notified).

Although not shown in FIG. 1, the area 112 can lead to other building areas (e.g., rooms, staircases, elevators, escalators, storage areas, or other places). In at least some cases, the area 110 includes an entrance 140 through which a user 150 can enter or exit the area 110. FIG. 1 also shows a sensor 160 for detecting a portable electronic device 170 carried by the user 150. Although FIG. 1 depicts the sensor 160 as being in the area 110, it can also be located elsewhere (e.g., in the area 112) and configured to detect activity in the area 110. FIG. 1 also shows an access terminal 180, whose functions will be explained in more detail below, Generally, the access terminal 180 is located at or near a boundary between the areas 110, 112.

Figure 2:
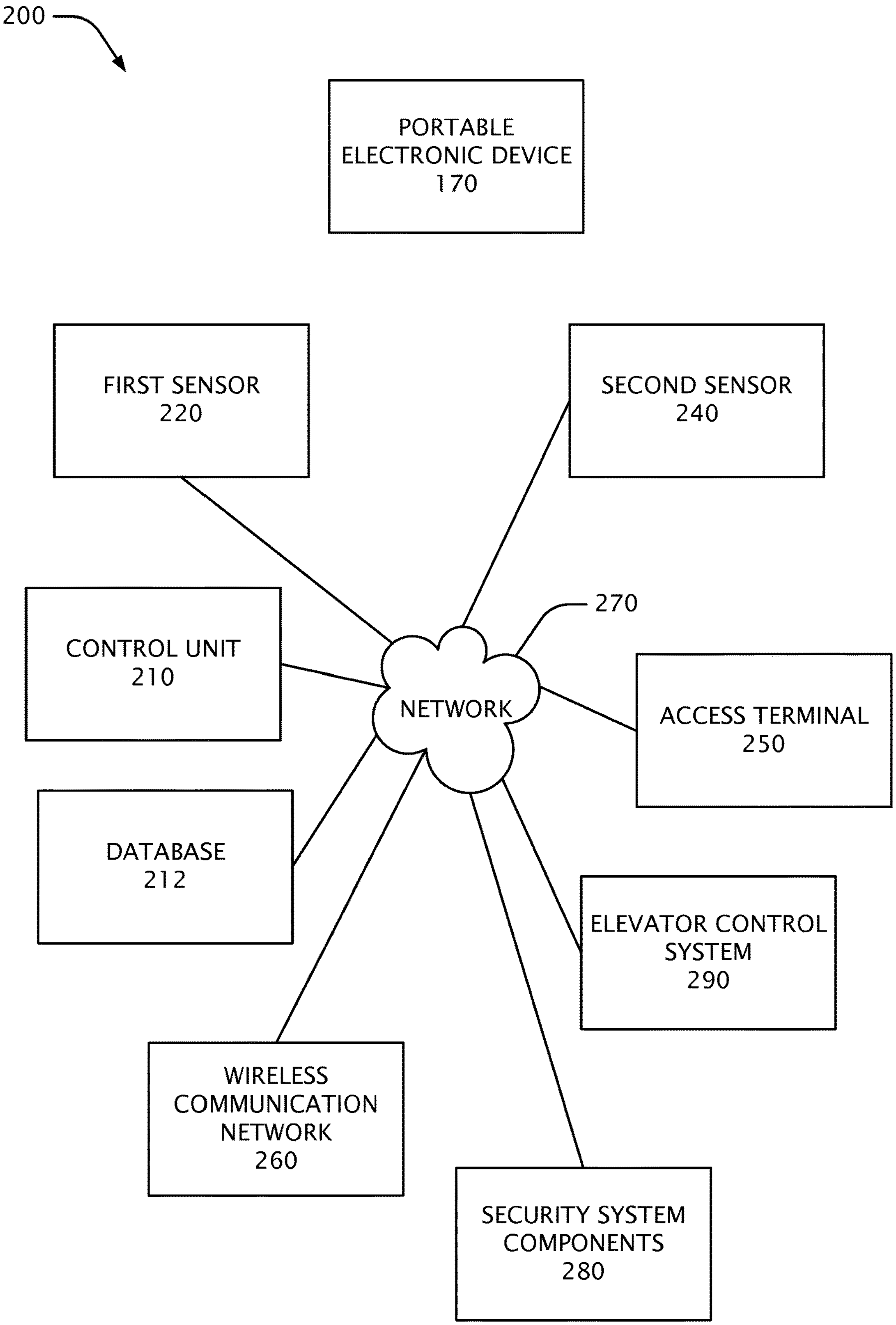
FIG. 2 shows a block diagram of an exemplary embodiment of an access control system.

FIG. 2 shows a block diagram of an exemplary embodiment of an access control system 200. The system 200 includes a computer-based control unit 210. The control unit 210 comprises, for example, a processor configured to perform one or more method acts described in this application. The processor reads corresponding instructions for the method acts from a memory component.

The control unit 210 is coupled to a first sensor 220, which can correspond to the sensor 160 of FIG. 1. The sensor 220 can communicate with a portable electronic device 170. The portable electronic device 170 is, for example, a smartphone, a mobile telephone, a tablet computer, a smartwatch, or another mobile electronic device. The control unit 210 is also coupled to a second sensor 240. In some embodiments, the second sensor 240 is omitted, and only the first sensor 220 is present, or vice versa. In one embodiment, both sensors 220, 240 include optical sensors to read an optical code.

The control unit 210 is further coupled to an access terminal 250, which can correspond to the access terminal 180 of FIG. 1. In some cases, the sensor 240 and the terminal 250 are integrated into a single unit; in other cases, they are separate components. In particular embodiments, the terminal 250 is a PORT terminal device from the Schindler Group of Switzerland. The control unit 210 is also coupled to a wireless communication network 260 that can communicate with the portable electronic device 170. The wireless communication network 260 comprises, for example: a long-range cellular communication network (e.g., 1G, 2G, 3G, 4G, or another type); a Wi-Fi network; a Bluetooth network; or another type of wireless network. The control unit 210 communicates with the various components of the system 200 through a network 270 (e.g., the internet, a local area network, or another type of network).

In further embodiments, the control unit 210 is also coupled to one or more security system components 280. Such components can include, for example, alarms, camera, sensors, locks, barriers (e.g., the movable barrier 130), or other components.

In additional embodiments, the control unit 210 is also coupled to an elevator control system 290. The elevator control system 290 can use information provided by the control unit 210 to operate an elevator system. For example, the elevator control system 290 can use such information to enable placing elevator calls (e.g., in a hotel, only a hotel guest may place a call to access a specified floor), and to place elevator calls, including destination calls. In addition, the control unit 210 may be used in connection with accessing hotel rooms.

Figure 3:
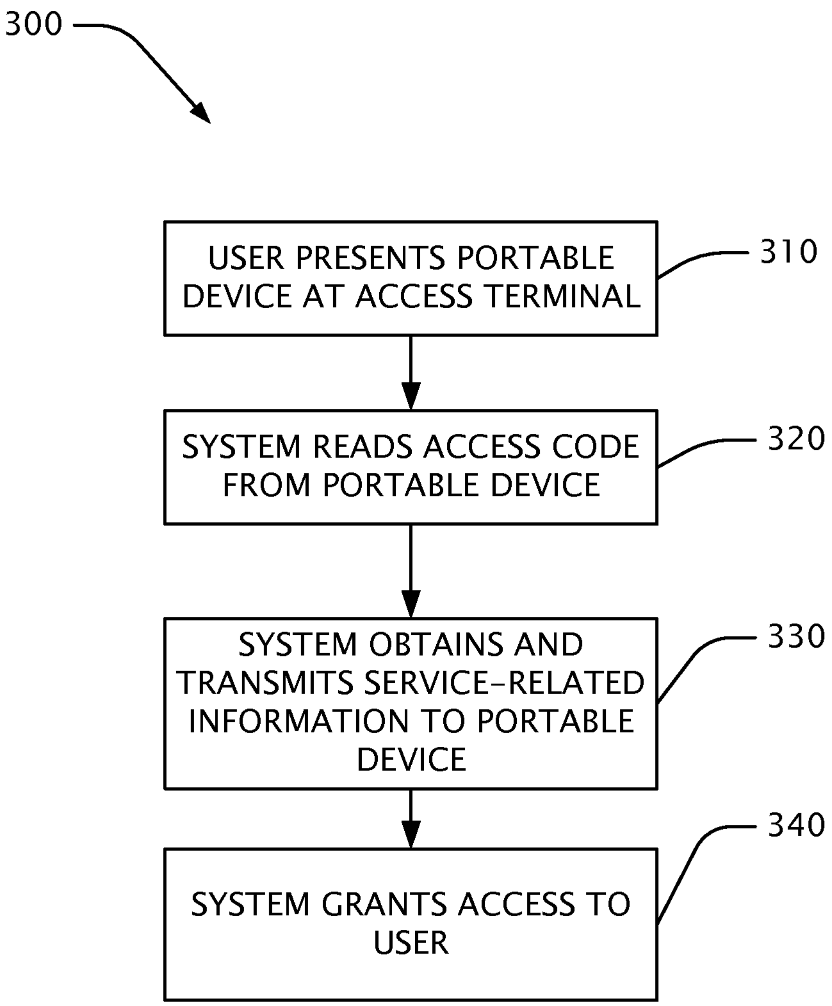
FIG. 3 shows a block diagram of an exemplary embodiment of an access control method.

FIG. 3 shows a block diagram of an exemplary embodiment of an access control method 300. The method is for controlling access to a predetermined service (e.g., guidance within a building or area, or transportation (elevator service)) or area, such as the area 12 of FIG. 1. Although the method 300 is described here in the context of the system 200 of FIG. 2, the method 300 can also be used with other system embodiments. In an exemplary scenario described with reference to FIG. 3, information related to an access code has been sent to the portable electronic device 170. The information is sent through a wireless communication network, such as the network 260 of FIG. 2, for example in form of an SMS to the portable electronic device 170. The SMS includes in one embodiment a web link the user is required to touch on the portable device 170 to activate the access code. At this stage, the user is in possession of an access right.

When the user intends to use the access right, the user touches a web link that is displayed on the portable device 170 and contained in an SMS. In response to using the web link, the system causes the access code, e.g., in form of an optical code (e.g., bar code, QR code or color code) to be displayed on the portable electronic device 170. In a method act 310, the user then presents the portable electronic device 170 with the displayed optical code at an access terminal.

In a method act 320, the system reads with a sensor in or near the terminal (e.g., the second sensor 240) the access code from the portable electronic device 170. The system verifies if the access code is valid.

In a method act 330, once the access code is read and determined to be valid, the system obtains and provides service-related information to the portable device 170. The service-related information may include an indication which door, gate, platform, hallway, elevator or path the user should use. The service-related information may be provided to the user by means of text, one or more pictograms or symbols, or an audible announcement, a webpage or a combination of these means. The transmission of the access-related information to the portable electronic device 170 occurs in one embodiment via the internet, as described above with reference to the network 270.

In certain applications, the method described with reference to FIG. 3 may further include displaying dynamic information on the portable electronic device 170. The user uses the web link in an SMS, as described above, to obtain the web service. In response, the portable electronic device 170 displays a webpage, for example, using HTML5 or Javascript. In one embodiment, the webpage is dynamic and adapts the displayed content to a particular status of a process. Using the displayed webpage, the user can request that the access code (optical code) is displayed. Depending on a particular embodiment, the user is required to explicitly request the display of the access code (e.g., by clicking a symbol or field), or the access code is displayed automatically, without further action by the user.

As the portable electronic device 170 now displays the access code, the user can present the portable electronic device 170 to an optical reader for reading the access code. The system verifies the access code and determines what action is associated with that access code. For example, the access code may be required access to an access-restricted area. In that case, the system grants access if the code is valid (e.g., known and not yet expired). The access code may further be used to obtain service-related information. In such a case, the system provides the information to the user, again if the code is valid. The information may be provided to the user using an SMS or a push notification. In one embodiment, the information is provided via the mentioned dynamic webpage. The system causes the displayed content of that webpage to be adapted to the current state of the process. In that embodiment, the user is not required to perform any action and the service-related information is displayed automatically. In that way, feedback to the user is provided via the dynamic webpage as a feedback channel. In one embodiment, the feedback via the webpage may be combined with at least one audio message to assist users that are visually impaired.

These embodiments illustrate that the technology described herein can be used with any portable electronic device 170 that enables SMS, entail or web services. The technology does not require that a particular software or application (APP) is installed on the portable electronic device 170. This is especially beneficial for users that are not too familiar with installing apps, or may not be allowed to installed apps due to a company policy.

In one illustrative embodiment, the user requires an elevator to reach a desired destination (e.g., a floor). To obtain access to an elevator and to be able to call an elevator, the user presents the portable electronic device 170 (see method act 310) with the displayed access code to the access terminal. In response to such an elevator call, the elevator control system 290 processes a received control signal and assigns an elevator to service that call. If there are several elevators in a building e.g., elevators A-D, the elevator control system 290 selects in one embodiment an elevator that can service the call the fastest. The system obtains information about which elevator has been assigned to that elevator call and provides that information as part of the service-related information to the portable electronic device 170, e.g., via the mentioned webpage as feedback channel. The service-related information may include guidance information. e.g., how to reach the assigned elevator. In a method act 340, the system grants access to the user.

In certain applications, higher security requirements may be defined (e.g., only a known and authorized user may access, but not a person that—in whatever way, legal or illegal—obtained the access code), and additional features may be implemented in the system. For example, in a situation where the user received the access code already before approaching the areas 111, 112, e. g., at home, one additional feature includes an authentication of the access code. Before granting access to the user in the method act 340 and in response to the reading of the access code in the method act 320, the system may request an authentication to ensure that access is granted only to the known and authorized user that originally requested access to the area 112. In one embodiment, the system retrieves or generates a verification code in response to the access code being read (method act 320) from the portable device 170.

The system sends the verification code to the portable device 170, i.e., to the same device that received the access code in the first place. In certain embodiments, the user may enter the verification code at the access terminal, e.g., by keying in a PIN, or the sensor in or near the terminal (e.g., the second sensor 240) senses the verification code from the portable electronic device 170 when presented to the sensor. The system grants access to the user only when the verification code is provided within a set time limit. In certain embodiments, the verification code is a PIN or an optical code. The verification code may be valid for only limited amount of time (e.g., 1 minute, 2 minutes, 5 minutes, 10 minutes), which is selected to be as short as possible.

When the user presents the device 170 to the terminal in the method act 330, the device 170 is in an "unlocked" state. In this application and in the claims, the device 170 is "locked" in the sense that at least some functionality of the device 170 or some information stored in the device 170 is unavailable unless the user "unlocks" the device 170 by authenticating to the device 170. For example, with some smartphones a user must type in a PIN or input other information into the phone to access programs or data stored on the phone. Other devices can be unlocked using biometric data (e.g., a fingerprint), a gesture on a touch-sensitive area, or a combination of input types. Only when the device is unlocked can the optical access code be displayed and subsequently be read in the method act 320.

In particular embodiments, the access code is generated by a web server. The web server sends the access code to the database, the control unit, and the portable electronic device 170. In further embodiments, the access code is generated by the database, which then sends the access code to the control unit and to the portable electronic device 170. The access code can also be generated by the control unit. The verification code can be generated accordingly.

In any of the disclosed embodiments, the validity of the access code can be limited to a certain amount of time after the code is sent to the portable electronic device 170 (e.g., 1 minute, 2 minutes, 5 minutes, 10 minutes), limited to a certain time period (e.g., Wednesday between 9 AM and 10 AM), or to a certain number of uses (e.g., the access code can be used only once, twice, five time, ten times, or another number of times). As mentioned above, the verification code is preferably limited to a certain amount of time because the user is already at the access terminal and can enter the access code essentially without a delay. In such a situation, the verification takes places while the user is at the access terminal expecting to access the area.

At least some versions of the disclosed technologies can be used in settings where various areas within a region have different security levels or requirements. For example, in one embodiment, a user is granted access to a secure area by presenting to an access terminal a portable electronic device 170 on which a corresponding access code is stored, the user having previously unlocked the device 170. The validity of the access code is limited to a certain amount of time after the code is sent to the device 170 (e.g., 1 minute, 2 minutes, 5 minutes, 10 minutes, a half day, a day, or another amount of time).

This embodiment can be combined with an embodiment that initially requires presenting an unlocked device 170 with the access code followed by providing the verification code, after which the presentation of a locked device 170 with the access code is sufficient. In a building with several individual secure areas, each with its own access terminal, presentation of the unlocked device 170 for providing the access code and the verification code may be sufficient for obtaining access only within a specific area (e.g., at the main entrance of the building). After a selected time period (e.g., a half day, a day, or another time period), the access control system may require the user to again present an unlocked portable electronic device 170 to an access terminal, even if the user has not left the specific area.

Figure 4:
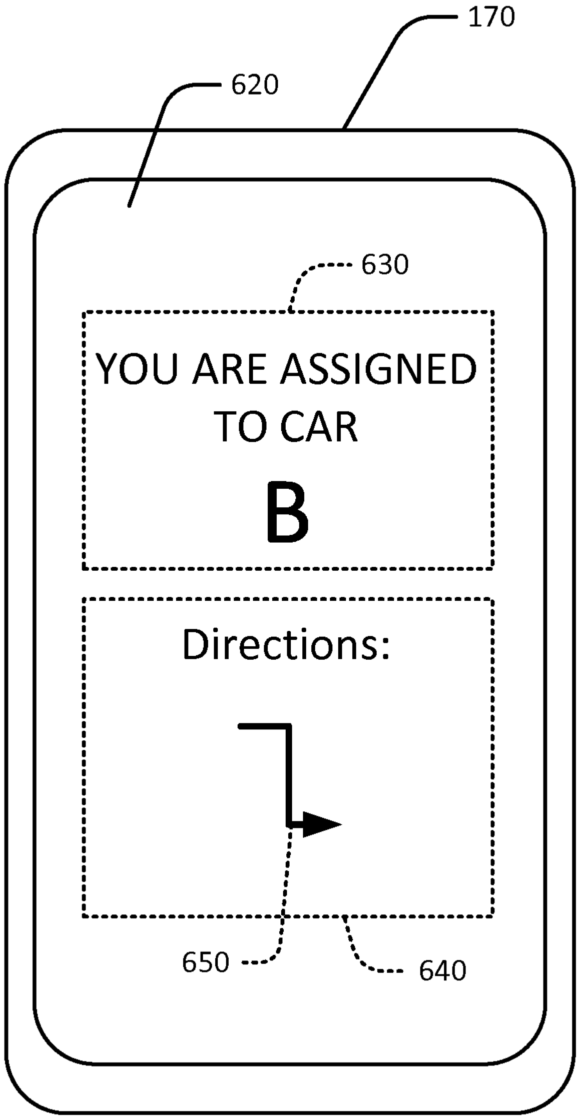
FIG. 4 shows an exemplary embodiment of a portable electronic device with an indication of an assigned elevator and guidance information.

An exemplary display 620 of the portable electronic device 170 is shown in FIG. 4. The assigned elevator (here: car 8) is indicated in a field 630 and the guidance information is indicated in a field 640. In one embodiment the guidance information may be shown be means of an arrow 650.

Figure 5:
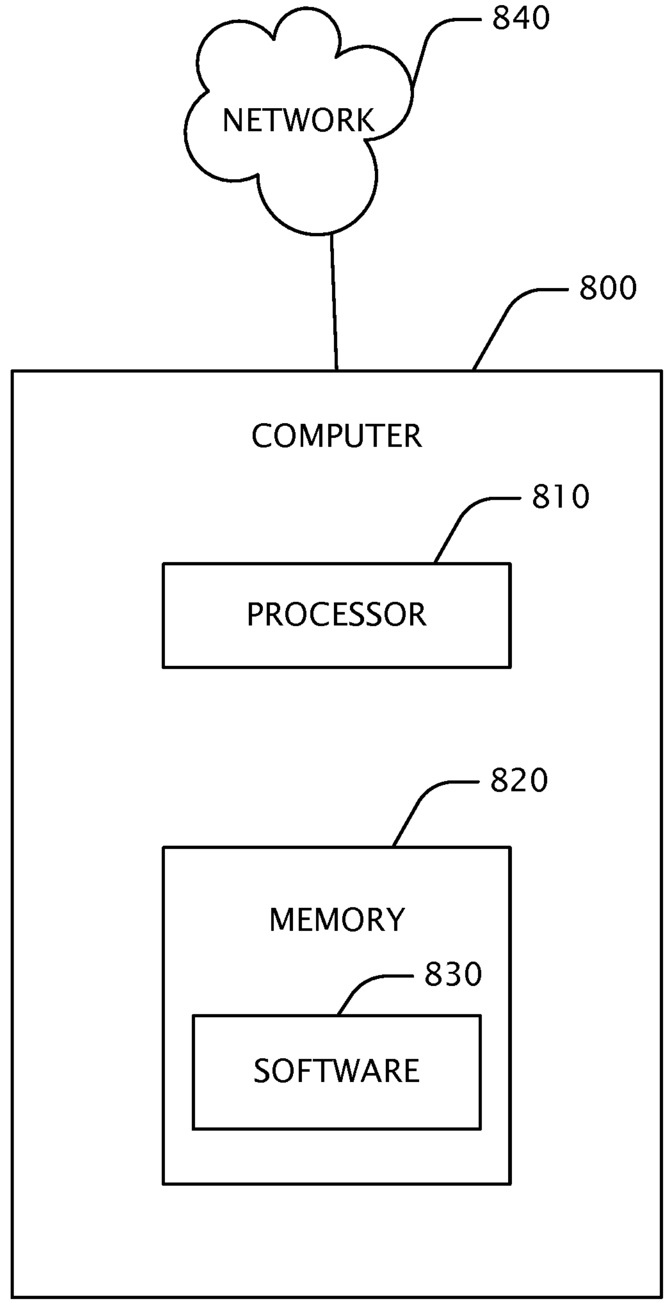
FIG. 5 shows a block diagram of an exemplary embodiment of a computer.

FIG. 5 shows a block diagram of an exemplary embodiment of a computer 800 (e.g., part of an access control system control unit, part of a portable electronic device 170, part of an access terminal, part of an elevator control unit, part of a database, part of a wireless communication network) that can be used with one or more technologies disclosed herein. The computer 800 comprises one or more processors 810. The processor 810 is coupled to a memory

820, which comprises one or more computer-readable storage media storing software instructions 830. When executed by the processor 810, the software instructions 830 cause the processor 810 to perform one or more of the method acts disclosed herein. Further embodiments of the computer 800 can comprise one or more additional components. The computer 800 can be connected to one or more other computers or electronic devices through an input/output component (not shown). In at least some embodiments, the computer 800 can connect to other computers or electronic devices through a network 840. In particular embodiments, the computer 800 works with one or more other computers, which are located locally; remotely, or both. One or more of the disclosed methods can thus be performed using a distributed computing system.

At least some of the disclosed embodiments can provide more convenient and user-friendly access control. For example, to access a secure area, a user does not need to carry a token besides the portable electronic device 170, which can be something that the user keeps with him or her for additional purposes, such as a smartphone. Also, during operation of the system in some embodiments the user does not need to manually input or even know the access code.

Embodiments requiring a user to be in possession of a portable electronic device 170, to be able to unlock the device 170 and to be able to enter a verification code can serve as an improved multiple-factor-authentication method.

Figure 6:
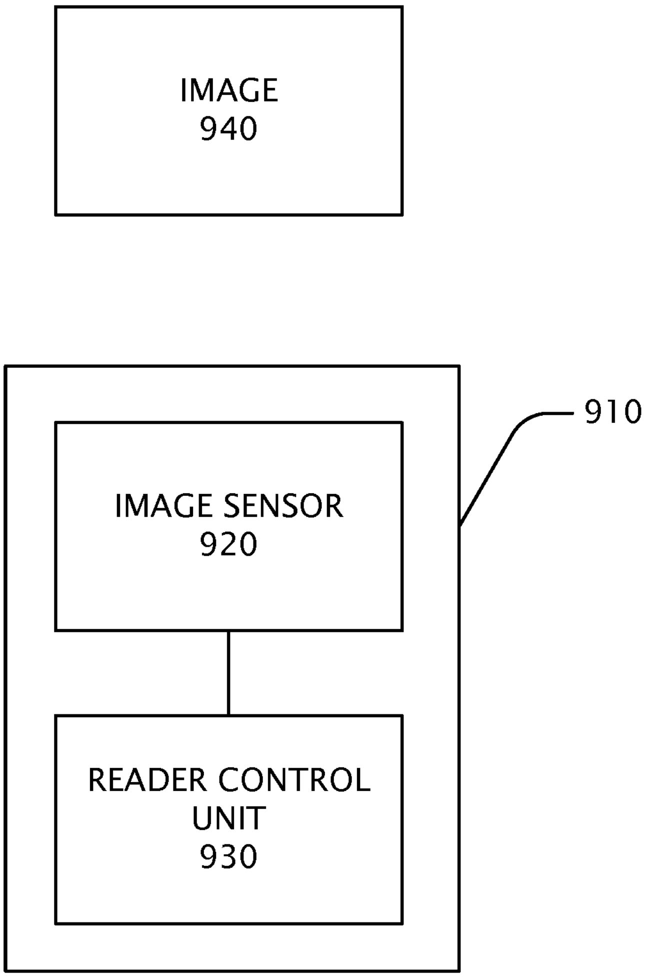
FIG. 6 shows a block diagram of an exemplary embodiment of an optical reader.

FIG. 6 shows a block diagram of an exemplary embodiment of an optical reader 910 as it may be installed in the access terminal of FIG. 1 and coupled to the computer 800 of FIG. 5. The reader 910 comprises an image sensor 920 coupled to a reader control unit 930. The image sensor 920 comprises, for example, a CCD (charge-coupled device) sensor, a CMOS (complementary metal-oxide semiconductor) sensor, or another type of optical sensor. In some cases, the image sensor 920 can focus on an image; in other cases, the image sensor 920 is not equipped to focus on an image. The image sensor 920 can have a lens, or it can function without a lens. The reader control unit 930 is a computer-based device comprising a processor that is programmed to perform one or more of the method acts disclosed in this application. The processor can be coupled to a memory that stores corresponding instructions for the processor. The reader 910 senses ("reads") an image 940. The image 940 appears on a display of a portable electronic device (not shown), or on another surface (e.g., a piece of paper).

Optical codes used by the embodiments described in this application are one- or two-dimensional images. At least some of the example optical codes depicted in the application are generally square in shape, but other optical codes can have other shapes (e.g., rectangular, round, oval, triangular, or another shape). Information encoded in an optical code can include, for example, a number, a letter, a combination of letters and numbers, or any other type of information. Information encoded in the optical codes described in this application can be extracted from the code even if a portion of the code is not visible to the optical reader. This is possible because the encoded information is represented in multiple regions of the code. Specifically, particular features that represent the encoded information are repeated in multiple areas of the code. (Examples of such features are described elsewhere in the application.)

Figure 7:
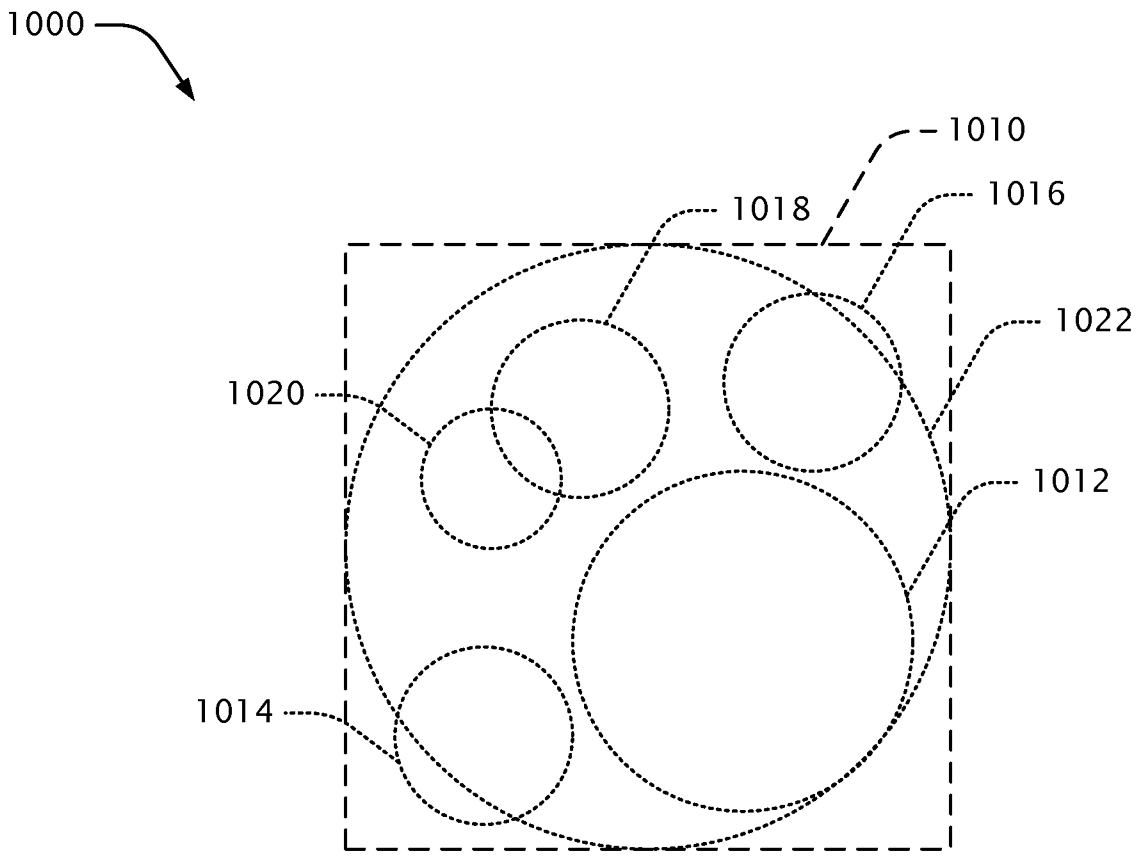
FIG. 7 shows an optical code.

FIG. 7 shows an optical code 1000 having an area 1010. (For clarity, detailed features of the code 1000 are not shown in FIG. 7.) In this example, a so-called encoding region 1012 contains sufficient features to represent the encoded information. The encoding regions 1014, 1016, 1018, and 1020 also each contain sufficient features to represent the encoded information. As seen in this example, encoding regions can have various sizes and positions. Two encoding regions can also partially overlap, such as the regions 1018, 1020. The region 1022 is an example of an encoding region that contains one or more other encoding regions. The information contained in any one of the regions 1012, 1014, 1016, 1018, 1020, 1022 is sufficient to allow the optical reader to decode the information encoded in the optical code 1000, even if one or more other portions of the code are not visible to the reader. A portion of the code may not be visible because, for example: the code is partially obscured by an object (e.g., a user's finger is on part of the display that is showing the code); the optical code is so close to the image sensor of the optical reader that some of the code is outside of the sensor's field of view; the image sensor is dirty or damaged; the display on which the code appears is dirty or damaged; or for another reason.

Generally, the larger the number of encoding regions in a code, the more likely that the code will be read successfully. Although the encoding regions shown in FIG. 7 are all circular, encoding regions can also have other shape (e.g., rectangular, round, oval, triangular, or another shape). Although the regions shown in FIG. 7 are each single, adjacent areas, in further embodiments an encoding region can comprise two or more non-adjacent areas. Each of the non-adjacent areas may or may not by itself contain sufficient features to represent the encoded information, but together they do contain sufficient features.

In at least some embodiments, the number and arrangement of the encoding regions of an optical code are selected according to a known or expected sensing area of an optical reader. The term "sensing area" refers to the area of the optical code that is captured by the optical reader. In different embodiments, the sensing area can have various shapes (e.g., rectangular, round, oval, triangular, or another shape). The "minimal sensing area" is the smallest area of the optical code that an optical reader can capture and still have enough sufficient features to decode the encoded information. In other words, the minimal sensing area needs to contain an encoding region of the optical code. Thus, the encoding regions of an optical code can be arranged such that, regardless of which portion of the optical code is read by the optical reader, as long as the portion is at least as large as the minimal sensing area, the reader can decode the encoded information from the optical code at any position within the code. Of course, in many cases an optical reader might capture as large of a portion of the code as possible, and so the actual sensing area can be larger than the minimal sensing area. A sensing area or a minimal sensing area can comprise a single, adjacent area, or it can comprise two or more non-adjacent areas.

When generating an optical code, it can be assumed that the minimal sensing area may not allow for a desired ease of decoding. For example, a minimal sensing area may provide enough information for decoding a code, but at a slower-than-desired rate, or at a higher-than-desired computational cost. For these reasons, a sensing area somewhat larger than the minimal sensing area can be used (e.g., an area that is larger by 1%, 5%, 10%, 15%, 20%, or by another amount). Using this larger sensing area can make decoding the code easier.

An optical code can be generated using one or more images. In some embodiments, the optical code is based on a single image. In further embodiments, the optical code is based on a combination of two or more images.

Figure 8A:
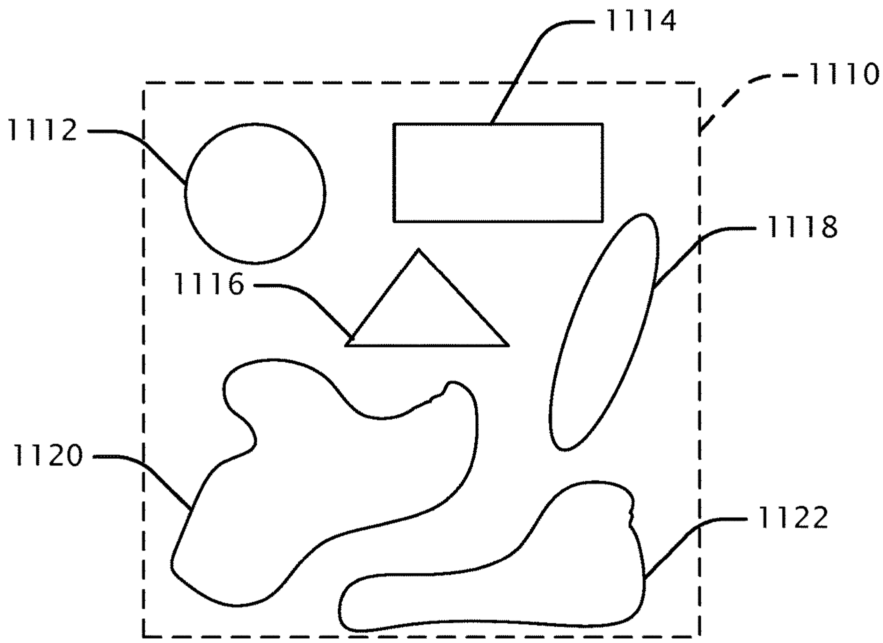
FIG. 8A shows a first exemplary image.
Figure 8B:
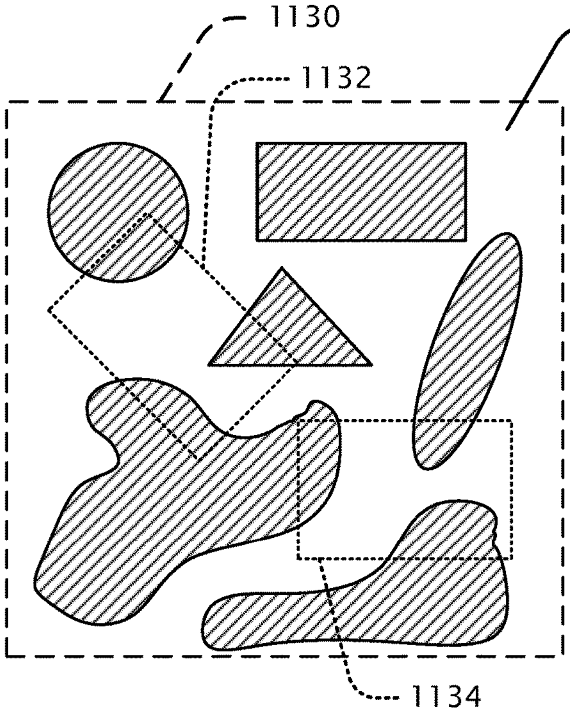
FIG. 8B shows a second exemplary image.
Figure 8C:
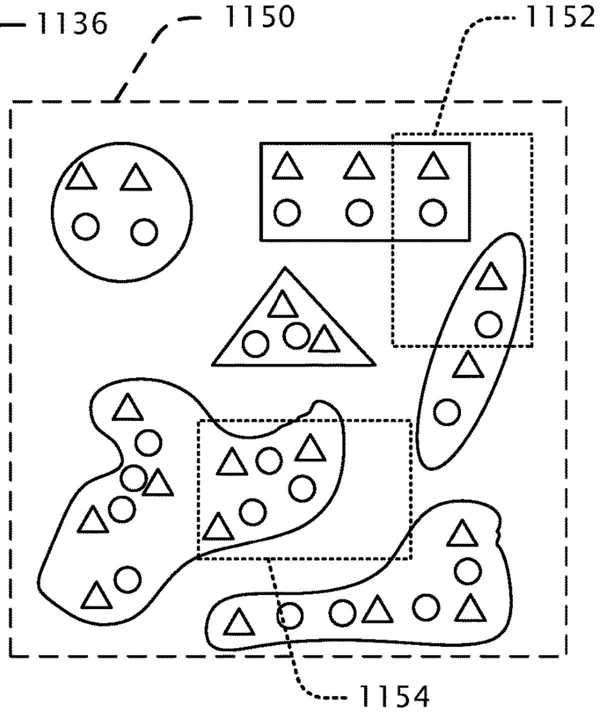
FIG. 8C shows a third exemplary image.

FIG. 8A shows an exemplary image 1110, which consists of multiple shapes 1112, 1114, 1116, 1118, 1120, 1122. Although it is not apparent from the line drawing, these shapes are each filled with the same solid color. FIG. 8B shows another exemplary image, which consists of multiple shapes like those in the image 1110. However, in this case, the surfaces are filled with a pattern, instead of with a solid color. FIG. 8C shows another exemplary image 1150, which consists of multiple shapes like those in the image 1110. However, in this case, the surfaces are filled with additional shapes, namely small triangles and small circles. In further embodiments, gradients can be used in an image, including shapes that are formed from gradients and thus appear to lack clearly defined borders.

The rectangle 1132 in FIG. 8B represents a minimal sensing area for an optical reader that is reading the image 1130. In this case, the portion of the image 1130 within the rectangle 1132 is filled by both patterned shapes of the image 1130 and by a background 1136. The presence of the shapes and of the background indicates the particular data that is encoded in the image. The rectangle 1134 represents another minimal sensing area for the image 1130. Also in this case, the portion of the image 1130 within the rectangle 1134 is filled by both patterned shapes and by the background 1136. A sensing area larger than the minimal sensing areas 1132, 1134 would likewise cover portions of both the background and the patterned shapes. In the case of FIG. 8B, the background 1136 can be, for example, a solid color or another pattern.

In various embodiments, the background of an image is not used to encode data, but to help calibrate the image sensor of the optical reader. The background can also serve as a decoration.

Turning to FIG. 8C, the rectangles 1152, 1154 each represent minimal sensing areas for an optical reader that is reading the image 1150. In this particular image, the relevant feature is the ratio of the number of small triangles to the number of small circles within a predefined area. In each of the areas 1152, 1154, the ratio of small circles to small triangles is 1:1. The optical reader can recognize this ratio and use it to identify the image 1150 (i.e., to distinguish the image 1150 from at least one other image). A sensing area larger than the minimal sensing areas 1152, 1154 would likewise cover a portion of the image 1150 in which the ratio of small circles to small triangles is 1:1, since this feature is generally consistent over the whole of the image 1150.

Figure 9:
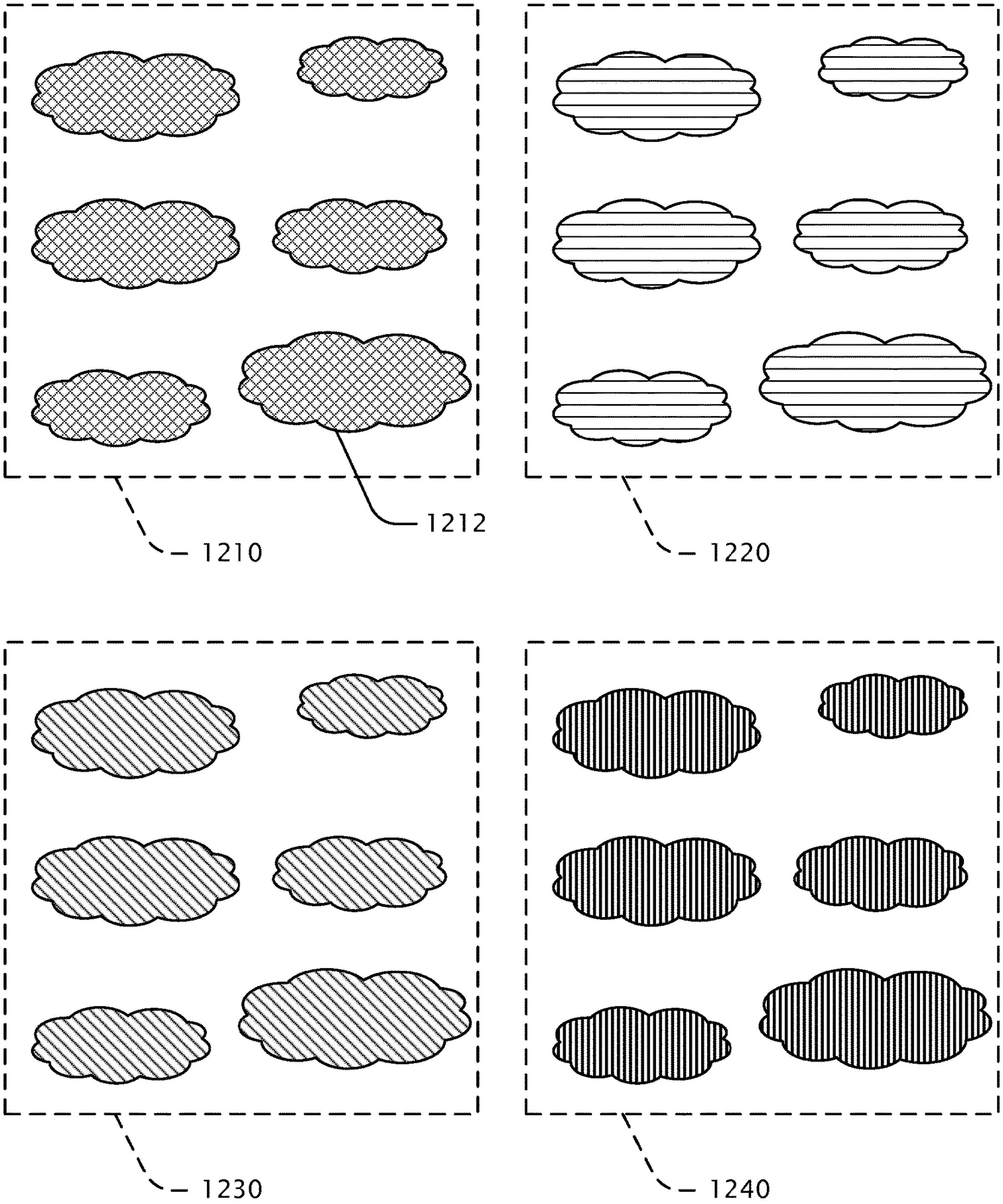
FIG. 9 shows exemplary images.
Figure 10:
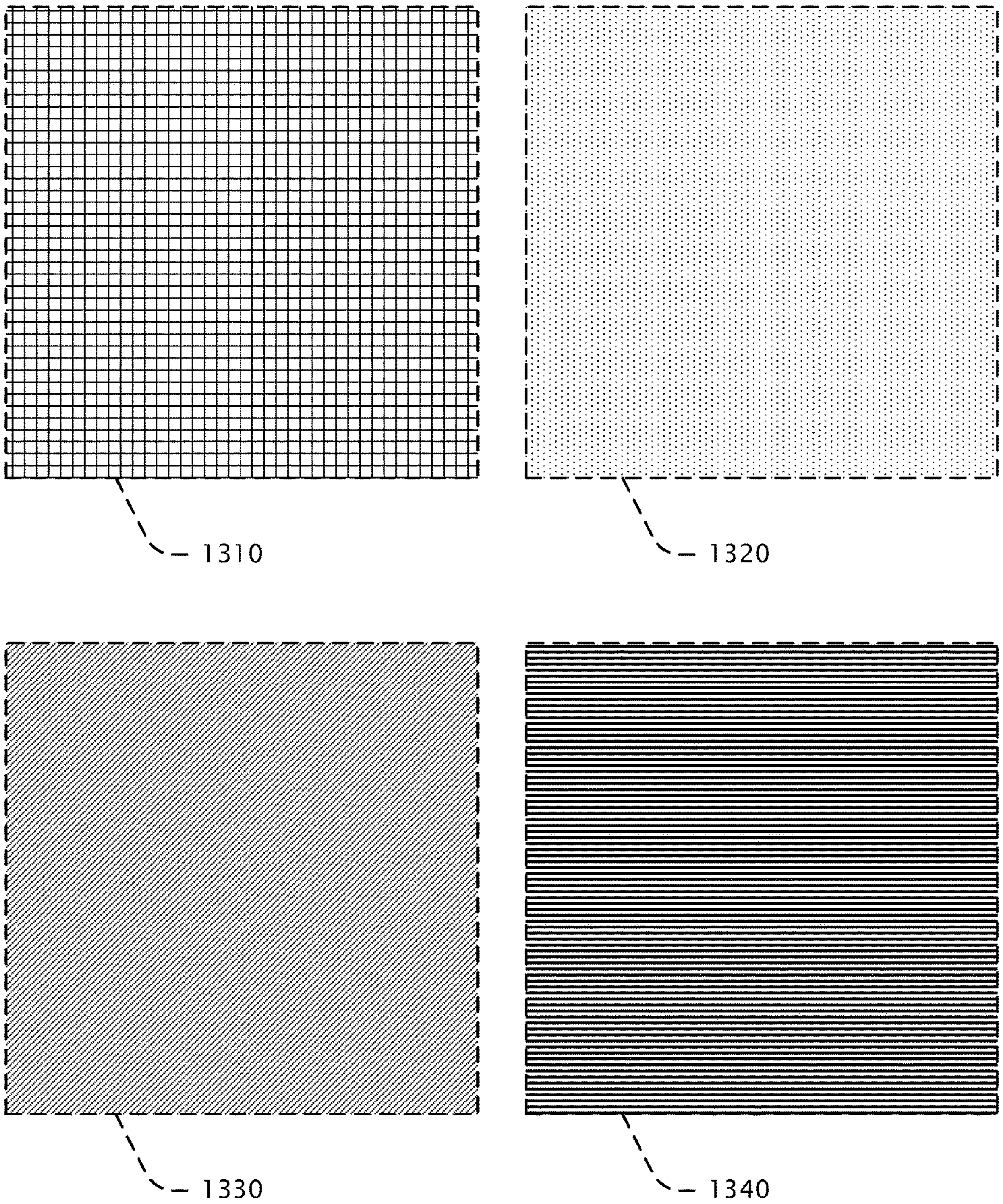
FIG. 10 shows exemplary images with respective patterns.
Figure 11:
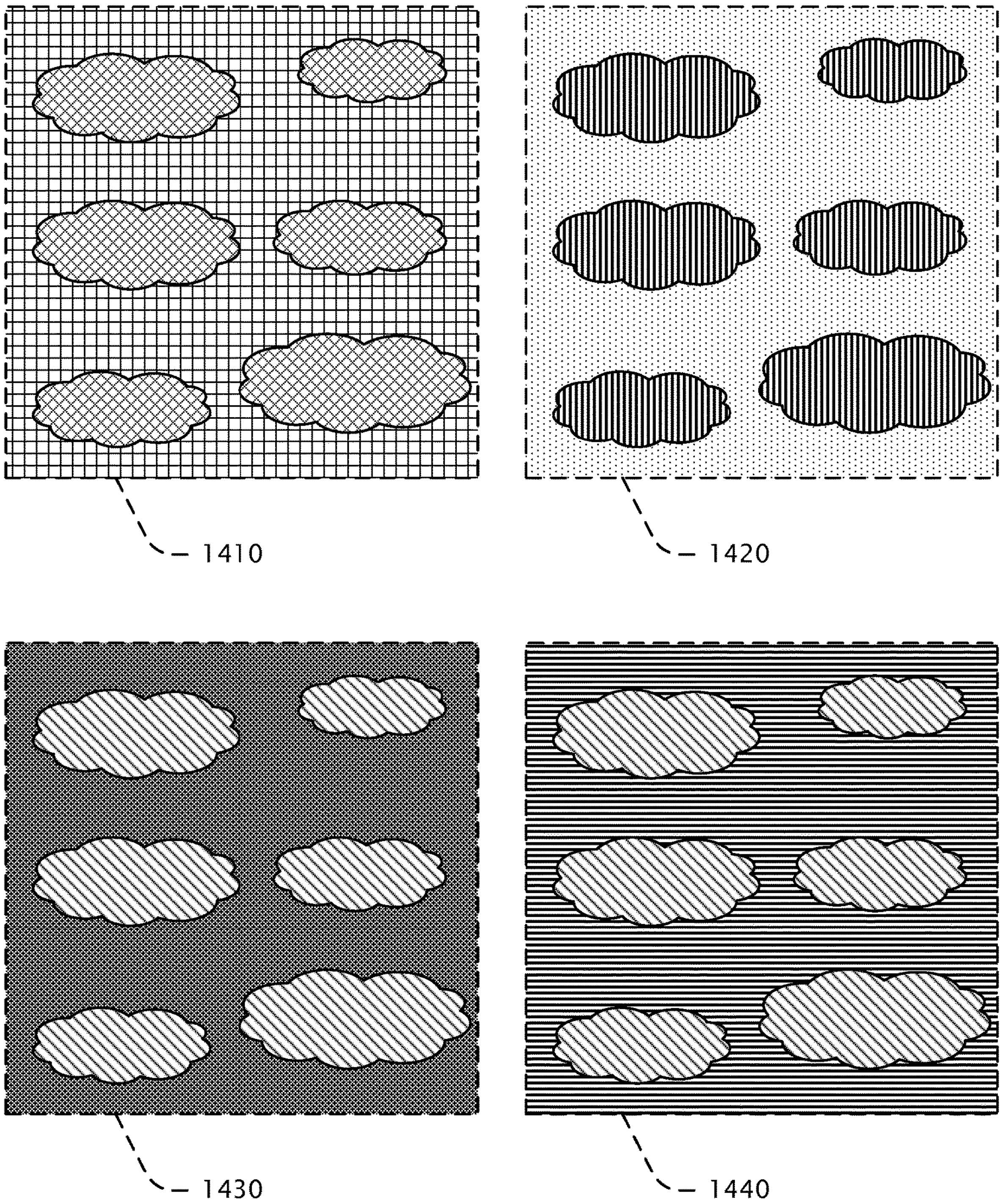
FIG. 11 shows exemplary combined images.

In some embodiments, an optical code is formed by combining one or more images. FIG. 9 shows exemplary images 1210, 1220, 1230, 1240, each of which comprises a group of shapes, such as the shape 1212 in image 1210. The images 1210, 1220, 1230, 1240 differ from each other in that their shapes are filled with different patterns. FIG. 10 shows exemplary images 1310, 1320, 1330, 1340, each of which is filled with a respective pattern. FIG. 11 shows how selected images of FIGS. 9 and 10 could be combined with each other to create optical codes. For example, the image 1410 is a combination of the images 1210 and 1310; the image 1420 is a combination of the images 1240 and 1320; the image 1430 is a combination of the images 1230 and 1330; and the image 1440 is a combination of the images 1230 and 1340. Each of the images in FIG. 11 can be used to represent a particular value. For example, the image 1410 can indicate a “0”, the image 1420 can indicate a “1”, the image 1430 can indicate a “3” and the image 1440 can indicate a “4”. Additional combinations based on the images of FIGS. 9 and 10 can also be used and assigned respective values.

In some embodiments, the images of FIG. 9 could be combined with a solid-colored background instead of with patterned backgrounds, like those of FIG. 10.

In further embodiments, elements of an optical code are arranged in a grid of spaces. The spaces in the grid can be square in shape, or they can have another shape. The spaces can have a border around the contents of the space (e.g., a black line, or a line of another color), or the spaces may have no border around their contents. Each element that is arranged in a space of the grid has a visible feature that allows the optical reader to distinguish it from another possible element (which may or may not actually be present in the grid). Possible features can include, for example: colors, patterns, shapes, gradients, letters, numbers, or other properties.

Figure 12A:
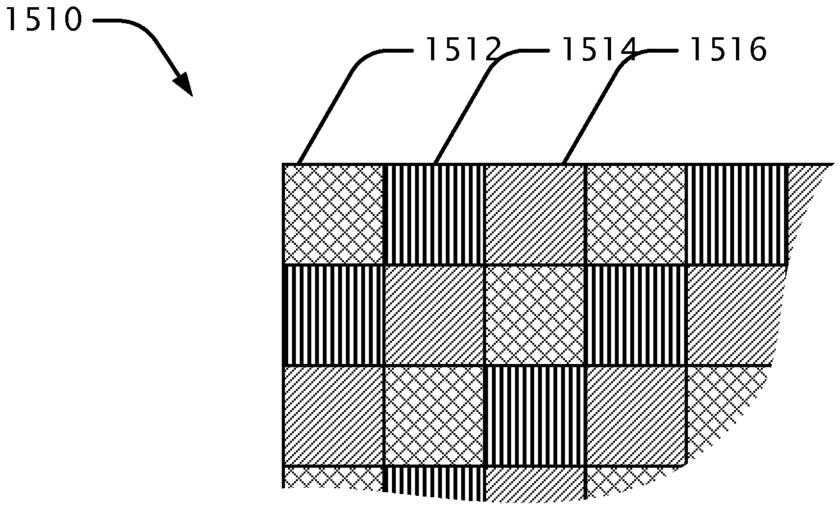
FIG. 12A shows portions of optical codes.

FIG. 12A shows an upper left-hand portion of an exemplary optical code 1510. The code 1510 comprises elements arranged in a grid, such as elements 1512, 1514, 1516. The elements 1512, 1514, 1516 are squares, each having a different fill pattern. The remaining square elements of the grid each have one of these fill patterns, such that the elements 1512, 1514, 1516 are repeated in sequence over the optical code 1510. The particular patterns used, the relative proportions in which elements with those patterns appear in the code 1510, or both, indicate the particular information encoded in the code 1510.

Figure 12B:
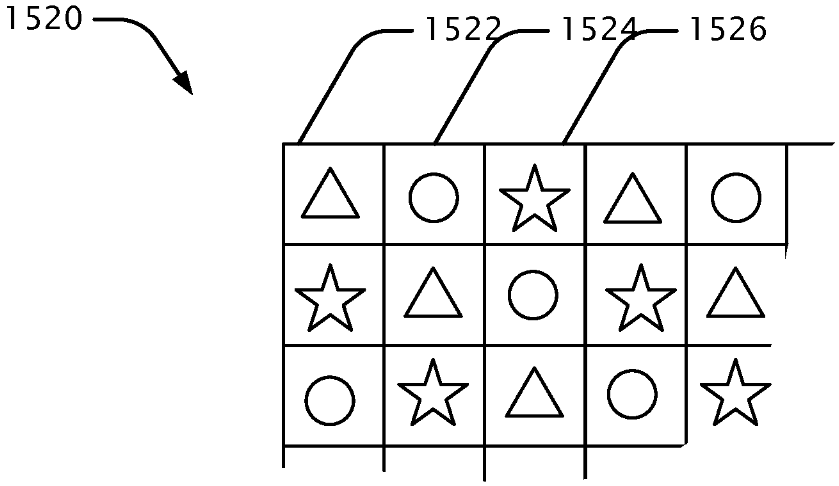
FIG. 12B shows portions of optical codes.

FIG. 12B shows an upper left-hand portion of an exemplary optical code 1520. The code 1520 also comprises elements arranged in a grid, such as elements 1522, 1524, 1526. These elements are squares, but they are filled with various shapes: the element 1522 contains a triangle, the element 1524 contains a circle, and the element 1526 contains a star. The remaining square elements of the grid each contain one of these shapes, such that the elements 1522, 1524, 1526 are repeated in sequence over the surface of the optical code 1520. The particular shapes used, the relative proportions in which elements with those shapes appear in the code 1520, or both, indicate the particular information encoded in the code 1520.

Figure 13:
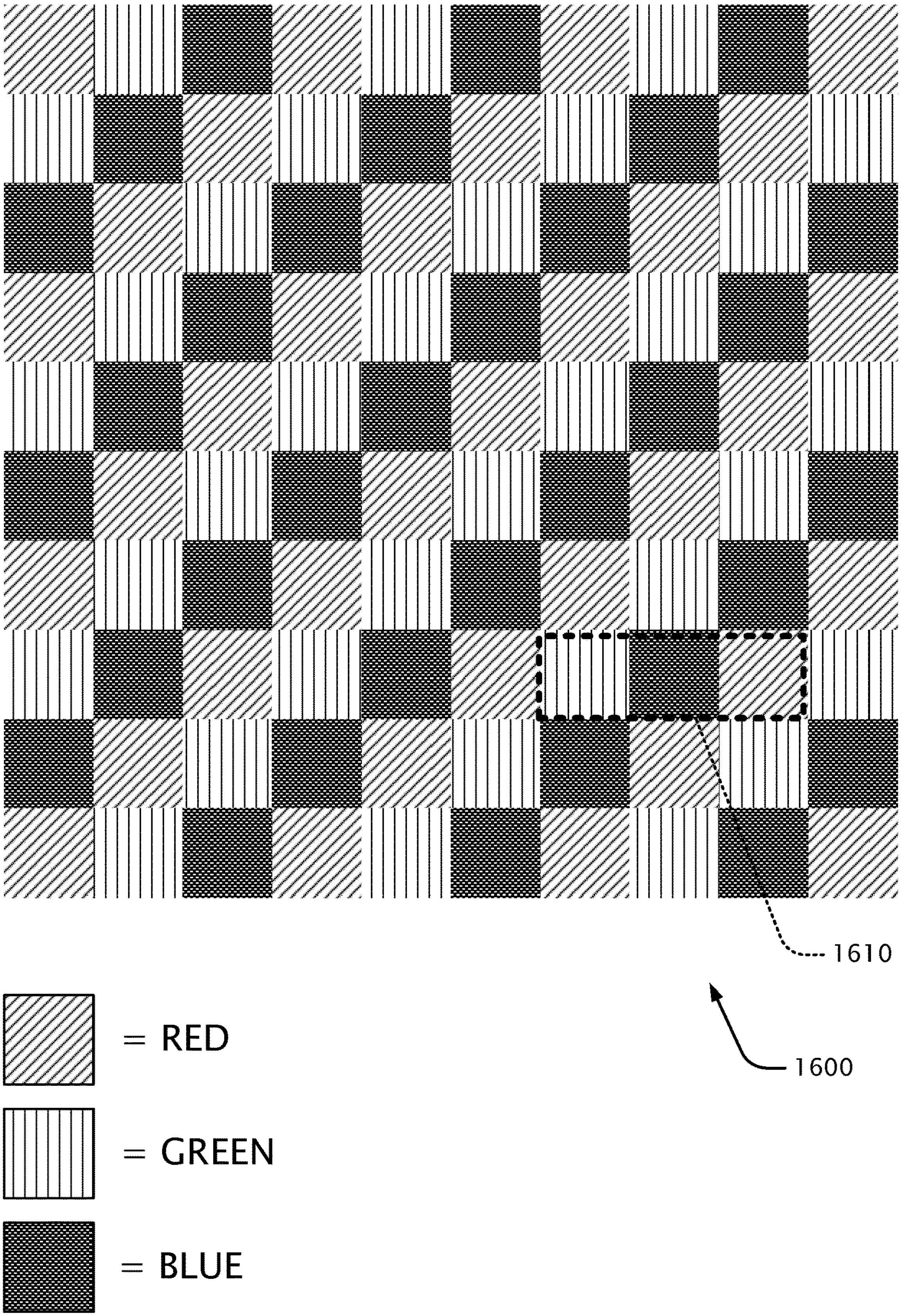
FIG. 13 shows an exemplary optical code in which the elements are arranged in a grid.

FIG. 13 shows an exemplary optical code 1600 in which the elements (color-filled squares) are arranged in a grid. Each of the elements in the grid is a red, green, or blue square. (In the line drawing of FIG. 13, each of the colors is represented by a different pattern, as indicated in the figure.) In one embodiment, the elements are approximately 0.2-0.3 cm square; other element sizes can also be used. Although the example of FIG. 13 uses three different colors of squares, additional embodiments can use any number of colors (e.g., two colors, four colors, five colors, six colors, or another number of colors), any number of fill patterns, or both. Generally, using a smaller number of colors or patterns means that the colors or patterns can be more distinct from each other, and thus more easily distinguished by the optical reader. However, using a larger number of colors or patterns increases the amount of information that can be encoded in an optical code.

The rectangle 1610 represents a minimal sensing area for the code 1600. In this case, the rectangle 1610 has a size of approximately one element by three elements. This area is large enough to determine the ratio of the red, green, and blue squares in the code 1600. Of course, larger sensing areas could also be used. For example, a sensing area that is three elements by three elements could be used. Depending on the embodiment, the ratio can be determined based on the number of squares, or based on the surface area occupied by the squares.

In some cases, the size of a minimum sensing area is at least partly a function of how many different types of elements are available (e.g., in this example, how many different colors of squares). For example, if the code 1600 could be constructed of squares of five different colors or ten different colors, then the rectangle 1610 would be too small to determine the ratio of all five colors or all ten colors. Generally, while the concept of minimal sensing area can be useful in understanding the disclosed technologies, the optical reader does not need to know or use a minimal sensing area of a particular optical code when decoding the code. In particular embodiments, the optical reader is programmed to recognize one or more features of an optical code and, based on the recognized features and their sizes, determine the size of the image. The reader can then scale the image, if needed. Based on the size of the image, the reader can also determine the minimal sensing area for the optical code.

The code 1600 can be used with an embodiment in which the ratio of a set of colors determines the value encoded in the code. Table 1 below gives an example encoding scheme. In the table. "R" stands for red, "G" stands for green, and "B" stands for blue.

TABLE 1

| Encoded Value | Ratio (R:G:B) |
|---|---|
| 0 | 1:1:1 |
| 1 | 2:1:0 |
| 2 | 3:0:0 |
| 3 | 1:0:2 |
| 4 | 0:0:3 |
| 5 | 1:2:0 |

Applying the encoding scheme of Table 1 to the example of code 1600, the code 1600 contains an R:G:B ratio of 1:1:1. Thus, the code 1600 is interpreted as encoding a value of 0.

In particular embodiments, depending on factors such as the size of the grid, the number of colors used for the grid elements, and the pattern used in arranging the elements in the grid, the optical code could appear to be composed of vertical or horizontal colored bars instead of individual square elements.

In further variations of the embodiment of FIG. 13, the grid spaces are occupied by colored shapes other than colored squares. For example, rectangles, circles, ovals, triangles, crosses, rhombuses, trigrams, or other shapes can be used. The examples of FIGS. 12A, 12B, and 13 describe embodiments in which elements (e.g., shapes, pattern-filled squares, color-filled squares) are repeated in a given order with a grid. In further embodiments, the elements in the grid are not repeated in any particular order. For example, the elements can be arranged in the grid in a random order, or in a pseudo-random order. However, in at least some cases, the minimal sensing area for an image can be smaller if the elements are repeated in a given order, since this can help ensure that the elements are distributed more evenly throughout the optical code.

The examples of FIGS. 12A, 12B, and 13 also describe embodiments in which a given set of elements is repeated along rows or along columns within the grid. For example, FIG. 13 shows a pattern of "red square, green square, blue square" repeated along each row of the grid. In further embodiments two or more sets of elements are repeated orthogonally to each other in a grid. In one example, a grid of colored squares contains a first set of elements, "red square, green square, blue square", and a second set of elements, "black circle, yellow star, green square gradient". The first and second sets are repeated over the grid, the first and second sets being arranged orthogonally to each other.

Figure 14:
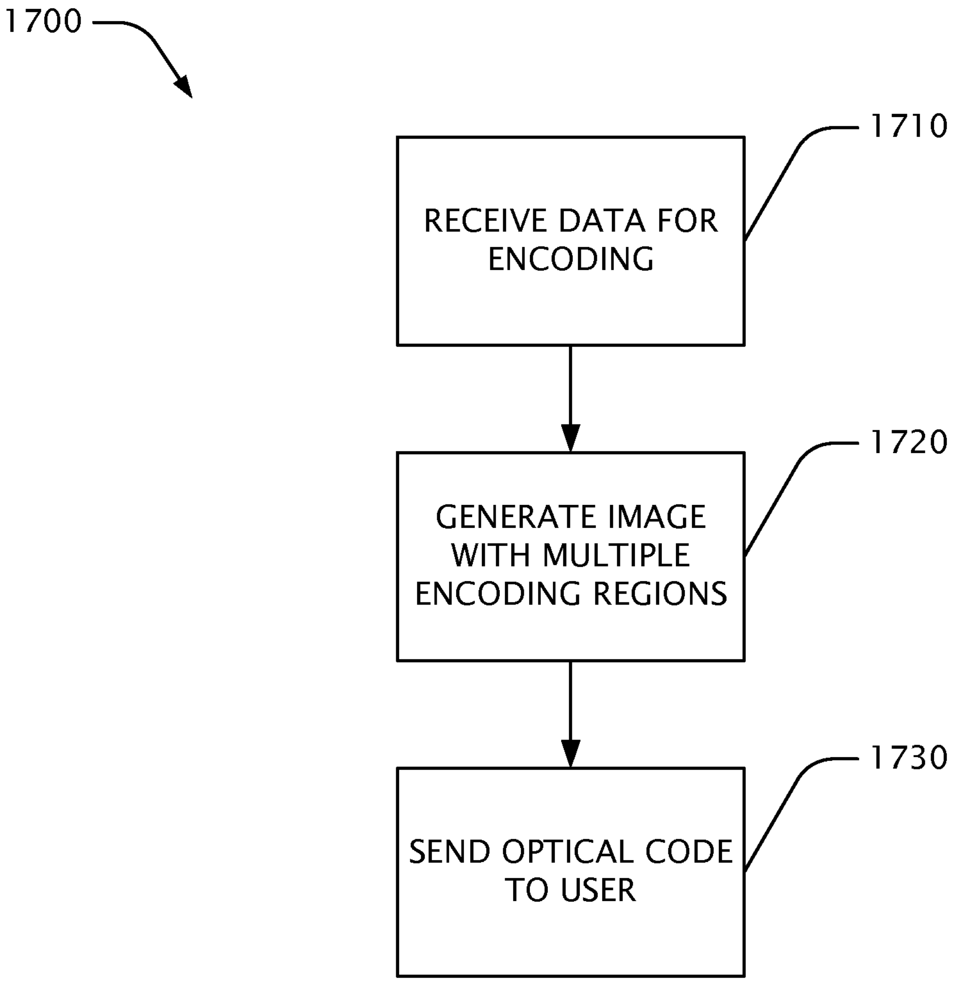
FIG. 14 shows an exemplary embodiment of a method for generating an optical code.

FIG. 14 shows an exemplary embodiment of a method 1700 for generating an optical code. The method 1700 is performed by a computer and can be used generally to generate any of the optical code embodiments discussed herein. In a method act 1710, the computer receives data for encoding in an optical code. The data comprises, for example, a number, a letter, a word, or another piece of information. In a method act 1720, the computer generates an image with multiple encoding regions, each of the regions containing a respective representation of the data. In other words, the data is encoded in each of the encoding regions so that, as discussed above, the data can be decoded using any one of the regions. In some cases, the optical code is sent to a user in a method act 1730. The user can then present the code to a code reader.

Figure 15:
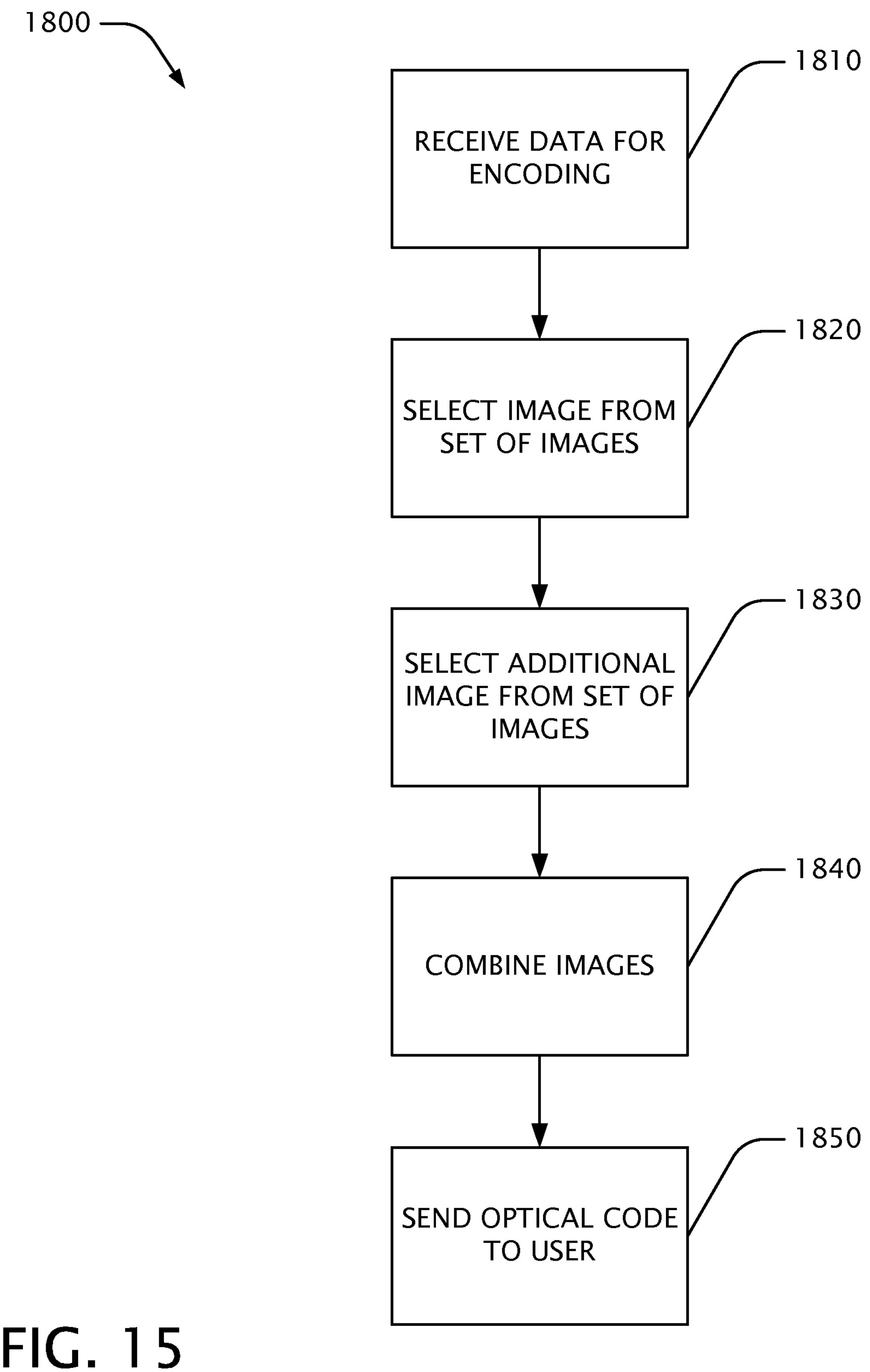
FIG. 15 shows an exemplary embodiment of another method for generating an optical code.

FIG. 15 shows an exemplary embodiment of another method 1800 for generating an optical code. Like the method 1700, the method 1800 is performed by a computer and can be used to generate any of the optical code embodiments discussed herein. In a method act 1810, the computer receives data for encoding in an optical code. The data comprises, for example, a number, a letter, a word, or another piece of information.

In a method act 1820, the computer selects an image from a set of encoding images. The encoding images are images that can be used to represent the data. For example, the image of FIG. 13, and the other images that are described in connection with the example of FIG. 13, can form a set of encoding images from which an image can be selected. The images from FIGS. SA-8C can also form such a set. In some cases, the selected image contains at least two elements that represent a ratio indicating the encoded data. For example, the optical code 1150 of FIG. 8C contains small triangles and small circles, which represent a ratio. As another example, in FIG. 13, the red, green, and blue squares represent a ratio. In other cases, the presence of particular elements (e.g., elements of a certain color or pattern) indicates the encoded data. In some embodiments, the image selected in the method act 1820 forms the optical code.

In some embodiments, after an image is selected, an additional image is selected from a set of encoding images in a method act 1830. The selected images are combined in a method act 1840 to form the optical code. The images of FIGS. 9 and 10 are examples of sets of images from which the two images could be selected. FIG. 1 shows examples of combined images created from the images of FIGS. 9 and 10.

Whether an optical code is generated based on combined images or on a single image depends on the particular embodiment. In many cases, similar or identical optical codes can be generated using single or combined images. For example, the image of FIG. 13 could be generated by combining three images, each comprising sets of squares for a respective color. As another example, the images of FIG. 11 could also each be stored as single images, so that they need not be generated from two separate images when used.

Returning to FIG. 15, in some cases, the optical code is sent to a user in a method act 1850. The user can then present the code to a code reader.

Figure 16:
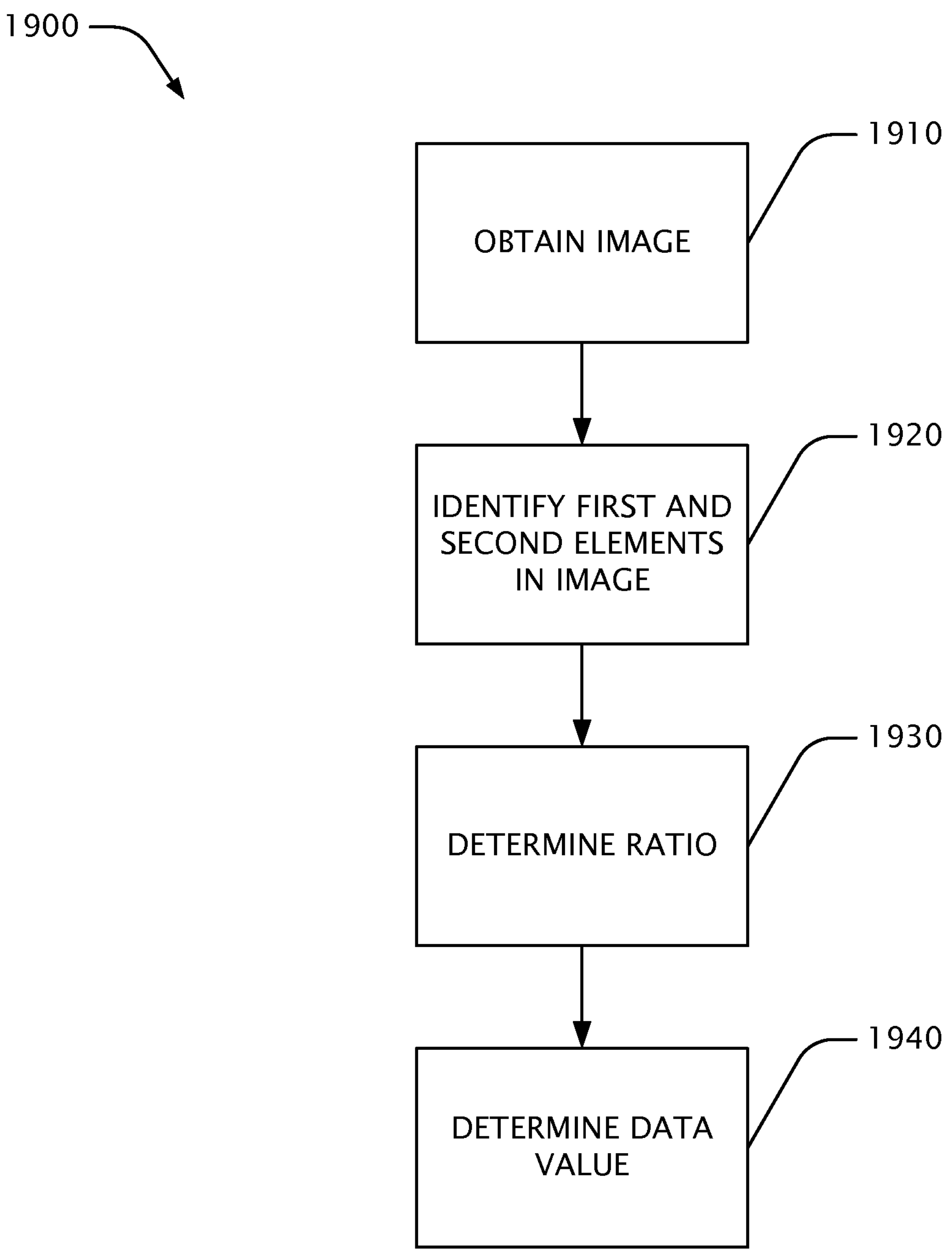
FIG. 16 shows an exemplary embodiment of a method for decoding an optical code.

FIG. 16 shows an exemplary embodiment of a method 1900 for decoding an optical code. In a method act 1910, an optical reader obtains an image using an image sensor. Usually, the image is at least a portion of a picture shown on the display of a portable electronic device. However, in some embodiments, the picture is on a piece of paper or other non-electronic surface. The picture comprises an embodiment of any of the optical codes disclosed herein. As such, the resulting image contains at least one encoding region, and possibly multiple encoding regions. A given encoding region can be comprised of multiple, non-adjacent, smaller areas. In some embodiments, each of the encoding regions contains at least first and second elements, the ratio between the elements representing a common, encoded data value. In other cases, the presence of particular elements (e.g., elements of a certain color or pattern) indicates the encoded data.

In a method act 1920, the optical reader identifies the first and second elements in the image. This can be done using any computer-vision algorithm, for example, algorithms from a computer-vision library such as OpenCV.

In some embodiments, the reader identifies the largest area or areas of each color in the image, possibly using a function from a computer-vision library. This technique can be used with, for example, the multi-colored grid of FIG. 16. Once the area of each color is determined, then a ratio of the areas of each color is determined. Based on the ratio, an encoded value is determined (e.g., using a lookup table). An example of pseudocode for such an embodiment (using colors) appears below:

```
a = find_area (color = red)
b = find_area (color = green)
c = find_area (color = blue)
r = evaluate_ratio (a, b, c)
encoded_value = decode (r)
```

Another example of pseudocode for such an embodiment (using shapes) appears below:

```
Num_shape_1 = count (findshape (cross))
Num_shape_2 = count (findshape (square))
r = evaluate_ratio (Num_shape_1, Num_shape_2)
encoded_value = decode (r)
```

In further embodiments, the reader identifies particular patterns or shapes in the optical code. Based on which patterns or shapes are present in the code, the reader determines an encoded value. An example of pseudocode for such an embodiment (using patterns) appears below:

```
a = find_pattern (dots)
b = find_pattern (lines)
c = find_pattern (crosshatch)
encoded_value = decode (istrue (a), istrue (b), istrue (c))
```

In embodiments that use a ratio between image elements, in a method act 1930 the ratio of the first and second elements of the image is determined. The ratio can be based on (1) the respective numbers of the first and second elements, or it can be based on (2) the sizes of the respective surface areas occupied by those elements in the image, or it can be based on a mixture of (1) and (2). In embodiments that do not use a ratio, this method act is omitted.

In a method act 1940, the optical reader determines the encoded data value based on the determined ratio or the determined elements. This can be done using, for example, a data structure that indicates which data values correspond to which ratios or to which pairs of elements. An example of this is Table 1, above. In some embodiments, the determined data value is passed on to another component or system, such as an access control system.

Although the method acts of the method 1900 are described as being performed by the optical reader, at least some of the method acts can be performed by a computer-based control unit, instead.

Figure 17:
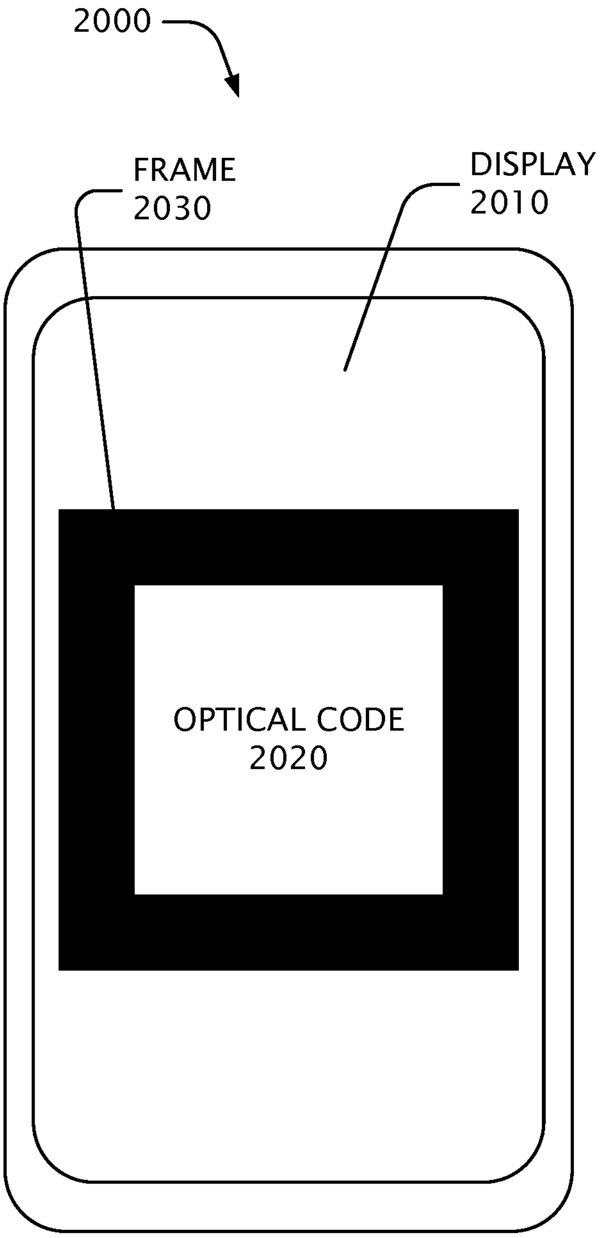
FIG. 17 shows an exemplary embodiment of a portable electronic device with an optical code.

FIG. 17 shows an exemplary embodiment of a portable electronic device 2000, which comprises a display 2010. In this embodiment, the optical code 2020 is shown on the display 2010 surrounded by a frame 2030. The frame 2030 helps show the boundaries of the code 2020 so that the optical reader is less likely to interpret objects outside of the code 2020 as being part of the code. In FIG. 17, the frame 2030 is a thick, black line, but in various embodiments, the frame 2030 can have other forms and colors.

In particular embodiments, the optical reader reads a series of multiple optical codes. The reader can view these codes on the display of, for example, a smartphone or other device, or on a non-electronic surface, such as a piece of paper. The codes are shown one after another, similar to the format of a motion picture or a slide show. The codes can be shown in a loop to allow the reader multiple opportunities to recognize them. Using multiple codes can increase the amount of information that the optical reader reads from the device. In some embodiments, one of the optical codes serves as parity information (e.g., as a parity bit, or as a parity image). In additional embodiments, one of the codes indicates the start of the series of codes.

In some cases, when the portable electronic device displays a sequence of optical codes, readability of the individual codes can be improved by displaying a "neutral" frame between each code. The neutral frame is an image that primarily serves to indicate a transition between optical codes. For example, the neutral frame can be a solid-color frame, such as black, gray, white, or another color. Additionally, the codes can be shown at a higher speed than a frame rate of the optical reader. For example, the codes can be shown at about twice the frame rate of the optical reader (e.g., the reader has a frame rate of about 30 fps, and the images are shown at about 60 fps). This can avoid problems that arise when the display of the electronic device and the image sensor of the optical reader are not synchronized.

A portable electronic device can display an optical code using various software programs, for example: a web browser; a media viewer (e.g., for graphics, for films, or both); a dedicated application; or another program.

In at least some of the disclosed embodiments, the features of an optical code are large enough to be discerned by the human eye.

In any of the disclosed embodiments, a fill pattern can include numbers, letters, or other characters. In further embodiments, an image for forming an optical code comprises one or more bars (straight bars, wavy bars, gradient bars) that extend across at least part of the image.

Generally, the disclosed embodiments allow an optical reader to read information from an optical code, even if a portion of the code is unreadable or unavailable. Thus, the robustness of the optical reader is improved.

At least some of the disclosed embodiments provide optical codes that can be read more quickly than other optical codes (e.g., QR codes). Also, any of the disclosed optical codes can be read when a portion of the code is not visible to the optical reader.

Generally, the disclosed embodiments allow an optical code to be read while the code is moving relative to the optical reader, which makes the code-reading process more robust. For example, the code can be read while it is moving towards or away from the reader. As another example, the code can be read while it is being rotated relative to the reader, or while being held at an angle relative to the reader. These aspects can improve readability in situations where a user does not hold the optical code still during reading (e.g., if the user is physically unable to do so because of age or handicap).

Further embodiments do not require an image sensor to be focused on the surface that is displaying the optical code. Thus, the image sensor does not need to be able to perform focusing. If the sensor can perform focusing, then the sensor will still be able to adequately read the code before focusing occurs. This can allow the code to be read more quickly, especially if the surface that is displaying the code is moving during reading.

The disclosed embodiments can generally be used with any optical code application. One example application is access control. A guest can receive an optical code from a host, the optical code having been sent at the request of the host. In some cases, a fee is charged for the request. The guest's smartphone can receive the optical code, possibly over a wireless network. The optical code can comprise a single image or a time-varying sequence of multiple images (e.g., a film). When the guest approaches the security gate at the host's building, the guest uses the smartphone to display the optical code, and the guest presents the smartphone to an optical reader. The reader reads the code from the phone and transmits the code to an access control system. In some embodiments, the access code is associated with an elevator call. The control system communicates the call to an elevator control system that assigns an elevator to service that call. Upon verifying the code, the access control system allows the guest to enter the building, and access-related information (e.g., the assigned elevator and guidance information) is communicated to the user.

Although certain data are described herein as being stored in a table or in another data structure, generally such data can be stored in any suitable type of data structure; a structure storing the data can be generated using an algorithm.

Although some embodiments of the various methods disclosed herein are described as comprising a certain number of method acts, further embodiments of a given method can comprise more or fewer method acts than are explicitly disclosed herein. In additional embodiments, method acts are performed in an order other than as disclosed herein. In some cases, two or more method acts can be combined into one method act. In some cases, one method act can be divided into two or more method acts.

Although many of the disclosed access system embodiments are generally described as controlling access to a physical area, any of the embodiments can be adapted to control access to information (e.g., information stored on a computer).

Unless stated otherwise, a phrase referring to "at least one of" a list of items refers to any combination of those items, including single members. As an example, "at least one of: a, b, or c" is intended to cover: a; b; c; a and b; a and c; b and c; and a, b and c. As another example, "at least one of: a, b, and c" is intended to cover: a; b; c; a and b; a and c; b and c; and a, b and c.

As used herein, a "user" can be a person, a group of persons, a machine, an object, or an animal.

What is claimed is:

1. A method of controlling access to a predetermined service or area, comprising:

sending an access code to a portable electronic device of a user before granting any access to the user to enter the predetermined area or to provide any service to the user;

reading, using an electronic reader at a service site, the access code from the portable electronic device of the user before granting any access to the user to enter the predetermined area or to provide any service to the user; and as a result of reading the access code from the portable electronic device, verifying if the access code is valid and, if it is valid, granting access to the user or providing service-related information to the portable electronic device.

2. The method of claim 1, further comprising sending the access code to the portable electronic device based on a device identifier of the portable electronic device.

3. The method of claim 2, wherein the device identifier comprises a global identifier for a communications system, the communications system being external to an access control system.

4. The method of claim 1, wherein the service-related information is provided to the portable electronic device using a webpage displayed on the portable electronic device.

5. The method of claim 4, further comprising using the webpage to display the access code on the portable electronic device.

6. The method of claim 4, further comprising using the webpage for requesting the access code.

7. The method of claim 1, further comprising generating an audio message in conjunction with the service-related information at the portable electronic device.

8. The method of claim 1, wherein the access code is displayed on the portable electronic device as an optical code.

9. The method of claim 1, further comprising processing an elevator call associated with the read access code and assigning an elevator to service the elevator call, wherein the processing and assigning is performed by an elevator control system.

10. The method of claim 1, wherein the service-related information comprises at least one of an indication of an assigned elevator and guidance information, and wherein the at least one of an indication of an assigned elevator and guidance information is communicated to the user via the portable electronic device.

11. The method of claim 1, wherein providing the service-related information includes causing the portable electronic device to display at least one of text and one or more pictograms or symbols, and/or to generate an audible announcement.

12. A system, comprising:

a sensor;

an access terminal at a service site;

a database; and a computer-based control unit coupled to the sensor, the access terminal, and the database, the control unit comprising a processor and a computer-readable storage medium, the computer-readable storage medium comprising instructions that cause the processor to;

send an access code to a portable electronic device of a user before granting any access to the user to enter the service site or to provide any service to the user;

read, using the sensor, the access code from the portable electronic device of the user before granting any access to the user to enter the service site or to provide any service to the user; and provide, as a result of reading the access code from the portable electronic device, service-related information to the portable electronic device.

13. The system of claim 12, wherein the sensor includes an optical reader to sense an optical code.

14. The system of claim 12, wherein the instructions further cause the processor to grant access to the user.

15. The system of claim 12, wherein the instructions further cause the processor to process an elevator call associated with the read access code and assign an elevator to service the elevator call, wherein the processing and assigning is performed by an elevator control system.

16. The system of claim 12, wherein the service-related information comprises at least one of an indication of an assigned elevator and guidance information, and wherein the instructions cause the processor to communicate at least one of an indication of an assigned elevator and guidance information to the user via the portable electronic device.

17. The system of claim 12, wherein the instructions further cause the processor to at least one of provide the service-related information to the portable electronic device-using a webpage displayed on the portable electronic device, to use the webpage to display the access code on the portable electronic device, and to use the webpage for requesting the access code.

* * * * *